US012597731B2

(12) United States Patent
Yan et al.

(10) Patent No.: US 12,597,731 B2
(45) Date of Patent: Apr. 7, 2026

(54) ELECTRICAL CONNECTION DEVICE

(71) Applicant: MOLEX, LLC, Lisle, IL (US)

(72) Inventors: Xaio Yan, ChengDu (CN); Min Chen, ChengDu (CN); Xu Yang, ChengDu (CN)

(73) Assignee: Molex, LLC, Lisle, IL (US)

( * ) Notice: Subject to any disclaimer, the term of this patent is extended or adjusted under 35 U.S.C. 154(b) by 354 days.

(21) Appl. No.: 18/449,331

(22) Filed: Aug. 14, 2023

(65) Prior Publication Data

US 2024/0162647 A1 May 16, 2024

(30) Foreign Application Priority Data

Aug. 15, 2022 (CN) ........................ 202210975575.X

(51) Int. Cl.

*H01R 13/502* (2006.01)
*H01R 13/514* (2006.01)
*H01R 13/52* (2006.01)
*H01R 13/627* (2006.01)

(52) U.S. Cl.

CPC ......... *H01R 13/502* (2013.01); *H01R 13/514* (2013.01); *H01R 13/5202* (2013.01); *H01R 13/6271* (2013.01)

(58) Field of Classification Search

None

See application file for complete search history.

(56) References Cited

U.S. PATENT DOCUMENTS 6,503,108 B1 * 1/2003 Kikuchi ............... H01R 13/645 439/594
2021/0242642 A1 8/2021 Tsai

FOREIGN PATENT DOCUMENTS

| | | | |
|---|---|---|---|
| CN | 109119792 | A | 1/2019 |
| CN | 106025709 | B | 12/2019 |
| CN | 210167536 | U | 3/2020 |
| CN | 216529741 | U | 5/2022 |
| JP | 2000150058 | A | 5/2000 |
| JP | 2004063115 | A | 2/2004 |
| JP | 2008041600 | A | 2/2008 |
| JP | 4591228 | B2 | 12/2010 |
| JP | 2011108576 | A | 6/2011 |
| JP | 2018037140 | A | 3/2018 |

(Continued)

*Primary Examiner* — Ross N Gushi

(57) ABSTRACT

An electrical connection device includes a through-type connector, a first cable-end connector and a second cable-end connector. The through-type connector includes an outer shell and a plurality of pins, the outer shell is formed with a first cavity and a second cavity, the first cavity has a first independent insertion groove and a second independent insertion groove. The first cable-end connector is provided to be capable of independently inserting into the first independent insertion groove and includes a first insulative housing, a first terminal position assurance member, a plurality of first terminals and a plurality of first conductive wires. The second cable-end connector is provided to be capable of independently inserting into the second independent insertion groove and includes a second insulative housing, a second terminal position assurance member, a plurality of second terminals and a plurality of second conductive wires. Therefore, convenience of assembling or detaching of the first cable-end connector and the second cable-end connector can be promoted.

20 Claims, 15 Drawing Sheets

(56) References Cited

FOREIGN PATENT DOCUMENTS

| | | | |
|---|---|---|---|
| JP | 2021026907 | A | 2/2021 |
| KR | 20100011831 | A | 2/2010 |
| KR | 20180071660 | A | 6/2018 |
| TW | I356542 | B | 1/2012 |
| TW | M628614 | U | 6/2022 |
| WO | 2013020359 | A1 | 2/2013 |

* cited by examiner

ELECTRICAL CONNECTION DEVICE

TECHNICAL FIELD

The present disclosure relates to an electrical connection device, and particularly relates to a through-type electrical connection device which is used to pass through a panel.

BACKGROUND

Two cable-end connectors of an existing through-type electrical connection device are firstly engaged together by a concave-convex cooperating manner, and then are assembled in a through-type connector at the same time. Harnesses connected by the two cable-end connectors are respectively used to be connected to two modules. When the two modules are different functional modules, for example, rotary transformer and decelerator respectively, and the two modules respectively belong to two different suppliers to supply, it will subsequently result in affect that assembling of the client-end is not convenient. One of reasons lies in that: when the two suppliers respectively supply an assembled cable-end connector and module to the client-end, only the client-end further needs to firstly engage the two cable-end connectors together, can the two cable-end connectors be assembled in the through-type connector. Another of the reasons lies in that: if the two cable-end connectors supplied by the two suppliers are just the same in structure, it will result in that the client-end cannot engage the two cable-end connectors together and cannot assemble the two cable-end connectors in the through-type connector, it makes the client-end subsequently further require the two suppliers to perform treatment of adjustment and modification. Therefore, to conceive a through-type electrical connection device which can overcome the above problem is a project to be improved by the present disclosure.

SUMMARY

Therefore, one of objects of the present disclosure is to provide an electrical connection device which is can overcome at least one deficiency in the existing technologies.

Accordingly, an electrical connection device the present disclosure comprises a through-type connector, a through-type connector and a second cable-end connector. The through-type connector comprises an outer shell and a plurality of pins passing through the outer shell, the outer shell is formed with a first cavity and a second cavity, the first cavity has a first independent insertion groove and a second independent insertion groove, two opposite ends of each pin are respectively positioned in the first cavity and the second cavity. The first cable-end connector is provided to be capable of independently inserting into the first independent insertion groove of the first cavity and comprises a first insulative housing, a first terminal position assurance member which is provided to the first insulative housing, a plurality of first terminals which are provided to the first insulative housing and are respectively electrically connected with the corresponding pins and a plurality of first conductive wires which are respectively connected to the plurality of first terminals. The second cable-end connector is provided to be capable of independently inserting into the second independent insertion groove of the first cavity and comprises a second insulative housing, a second terminal position assurance member which is provided to the second insulative housing, a plurality of second terminals which are provided to the second insulative housing and are respectively electrically connected with the corresponding pins and a plurality of second conductive wires which are respectively connected to the plurality of second terminals.

In some embodiments, an outer surface of the outer shell is recessed to form at least one annular groove, the through-type connector further comprises at least one annular sealing ring which is provided to the annular groove.

In some embodiments, the through-type connector is used to pass through a panel, the panel is formed with a through-hole which allows the outer shell to pass therethrough, the through-type connector further comprises a mounting plate which is formed to an outer surface of the outer shell and abuts against the panel, the mounting plate is formed with a mounting hole, the mounting hole is used to allow a fastener to pass therethrough so that the fastener fixes the mounting plate to the panel.

In some embodiments, the through-type connector further comprises at least one annular sealing ring which is provided to the outer shell, the annular sealing ring is used to seal a gap between the outer shell and the panel.

In some embodiments, the through-type connector further comprises a bushing which is provided in the mounting hole, the bushing is used to allow the fastener to pass therethrough.

In some embodiments, the through-type connector further comprises a sealing adhesive which is potted in at least one of the first cavity and the second cavity, the sealing adhesive seals gaps between the outer shell and the plurality of pins.

In some embodiments, the outer surface of the outer shell is recessed to form two annular grooves, the through-type connector comprises two annular sealing rings which are respectively provided to the annular grooves.

In some embodiments, the outer shell is formed with two latching grooves which are respectively communicated with the first independent insertion groove and the second independent insertion groove, the first insulative housing and the second insulative housing each have an elastic latch arm, the elastic latch arm has a latching block which is used to latch in the corresponding latching groove.

In some embodiments, the elastic latch arm further has a lock-releasing block which is exposed to the outer shell, the lock-releasing block is used to allow to be pressed down to make the elastic latch arm deflected and in turn force the latching block to move away from the corresponding latching groove, the lock-releasing block is further used to allow to be pulled to bring the first cable-end connector to move away from the first independent insertion groove or bring the second cable-end connector to move away from the second independent insertion groove.

In some embodiments, the first terminal position assurance member and the second terminal position assurance member each have one two-stage type latching structure, when the first terminal position assurance member moves along a first direction relative to the first insulative housing, the first terminal position assurance member is capable of being selectively positioned to a pre-latching position and a final-latching position by means of the two-stage type latching structure, when the second terminal position assurance member moves along the first direction relative to the second insulative housing, the second terminal position assurance member is capable of being selectively positioned to a pre-latching position and a final-latching position by means of the two-stage type latching structure.

In some embodiments, the two-stage type latching structure comprises two elastic latching arms which are inversely provided, each elastic latching arm extends along the first direction.

In some embodiments, the first insulative housing and the second insulative housing each have two first stopping blocks which are inversely provided and two second stopping blocks which are inversely provided, each first stopping block and the corresponding second stopping block are spaced apart from each other along the first direction, each elastic latching arm has a first latching hook and a second latching hook which are spaced apart from each other along the first direction, when the first latching hook of each elastic latching arm of the first terminal position assurance member and the second terminal position assurance member latches to the corresponding first stopping block, the first terminal position assurance member and the second terminal position assurance member is positioned to the pre-latching position, when the second latching hook of each elastic latching arm of the first terminal position assurance member and the second terminal position assurance member latches to the corresponding second stopping block, the first terminal position assurance member and the second terminal position assurance member is positioned to the final-latching position.

In some embodiments, the first insulative housing and the second insulative housing each have two guiding rail groups which are inversely provided, each guiding rail group has two guiding rails which are spaced apart from each other, each elastic latching arm has two slidable connecting bars which are respectively capable of being slidably connected to the corresponding guiding rails along the first direction.

In some embodiments, each elastic latching arm has a plurality of barbs which are arranged along the first direction.

In some embodiments, the first insulative housing and the second insulative housing each have a plurality of stopping members, each stopping member has two elastic cantilevered arms which are inversely provided, the first insulative housing and the second insulative housing each are formed with a passageway, the passageway has a gap which is between the elastic cantilevered arms of each stopping member, each elastic cantilevered arm is used to stop the corresponding first terminal or second terminal, the first terminal position assurance member and the second terminal position assurance member each have a partitioning plate, when the first terminal position assurance member and the second terminal position assurance member are positioned to the pre-latching position, the partitioning plate does not extend into the corresponding gap, when the first terminal position assurance member and the second terminal position assurance member are positioned to the final-latching position, the partitioning plate extends into the corresponding gap and partitions and stops the corresponding elastic cantilevered arms.

In some embodiments, a shape of the first independent insertion groove and a shape of the second independent insertion groove are different, a shape of the first cable-end connector and a shape of the second cable-end connector are different, the shape of the first cable-end connector and the shape of the first independent insertion groove cooperate with each other, the shape of the second cable-end connector and the shape of the second independent insertion groove cooperate with each other.

In some embodiments, the first independent insertion groove and the second independent insertion groove each have a first guiding groove portion, the first guiding groove portion extends along a first direction, the first guiding groove portion of the first independent insertion groove and the first guiding groove portion of the second independent insertion groove are spaced apart from each other along a second direction and are close to each other, or the first guiding groove portion of the first independent insertion groove and the first guiding groove portion of the second independent insertion groove are spaced apart from each other along the second direction and are away from each other, the second direction is perpendicular to the first direction, the first insulative housing and the second insulative housing each have a first sliding block which extends along the first direction, a position of the first sliding block of the first insulative housing and a position of the first guiding groove portion of the first independent insertion groove correspond to each other, the first sliding block of the first insulative housing is capable of being slidably connected to the first guiding groove portion of the first independent insertion groove, a position of the first sliding block of the second insulative housing and a position of the first guiding groove portion of the second independent insertion groove correspond to each other, the first sliding block of the second insulative housing is capable of being slidably connected to the first guiding groove portion of the second independent insertion groove.

In some embodiments, the first independent insertion groove and the second independent insertion groove each further have two second guiding groove portions which are spaced apart from each other along the second direction, each second guiding groove portion extends along the first direction, the first guiding groove portion and the second guiding groove portions are spaced apart from each other along a third direction which is perpendicular to the first direction and the second direction, the first insulative housing and the second insulative housing each have two second sliding blocks, positions of the second sliding blocks of the first insulative housing and positions of the second guiding groove portions of the first independent insertion groove respectively correspond to each other, the second sliding blocks of the first insulative housing respectively are capable of being slidably connected to the second guiding groove portions of the first independent insertion groove, positions of the second sliding blocks of the second insulative housing and positions of the second guiding groove portions of the second independent insertion groove respectively correspond to each other, the second sliding blocks of the second insulative housing respectively are capable of being slidably connected to the second guiding groove portions of the second independent insertion groove.

Accordingly, an electrical connection device of the present disclosure comprises a through-type connector, a first cable-end connector and a second cable-end connector. The through-type connector is formed with a first independent insertion groove and a second independent insertion groove. The first cable-end connector is provided to be capable of independently inserting into the first independent insertion groove and being electrically connected to the through-type connector. The second cable-end connector is provided to be capable of independently inserting into the second independent insertion groove and being electrically connected to the through-type connector.

The present disclosure at least has following effect: by that the first cable-end connector is capable of independently inserting into the first independent insertion groove of the first cavity and the second cable-end connector is capable of independently inserting into the second independent insertion groove of the first cavity, convenience of assembling the first cable-end connector and the second cable-end connector assemble to the through-type connector or detaching the first cable-end connector and the second cable-end connector assemble from the through-type connector can be promoted.

BRIEF DESCRIPTION OF THE DRAWINGS

Other features and effects of the present disclosure will be apparent in embodiments referring to the accompanying drawings, in which.

Figure 1:
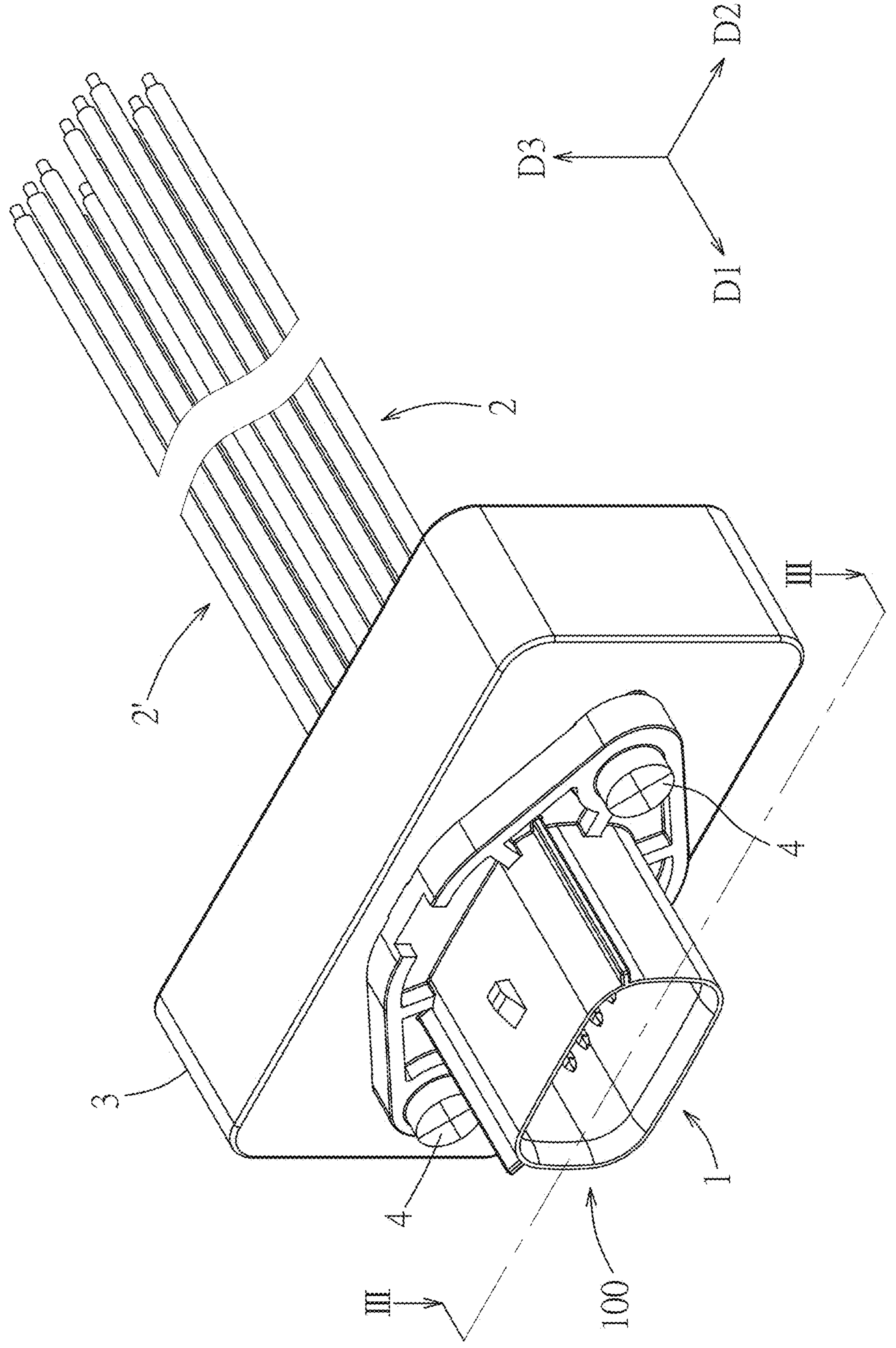
FIG. 1 is a perspective view of a first embodiment of an electrical connection device of the present disclosure assembled to a panel.

Reference numerals are presented as follows.

100 electrical connection device
1 through-type connector
11 outer shell
110 partitioning wall
111 first peripheral wall
112 second peripheral wall
113 penetrating hole
114 first cavity
115 second cavity
116 filling groove
117 first independent insertion groove
118 second independent insertion groove
119 first guiding groove portion
120 first guiding groove portion
121 second guiding groove portion
122 second guiding groove portion
123 annular groove
124 latching groove
13 mounting plate
131 mounting hole
14 pin
15 annular sealing ring
16 sealing adhesive

17 bushing
2 first cable-end connector
2' second cable-end connector
21 first insulative housing
21' second insulative housing
210 housing body
211 guiding rail group
212 first sliding block
213 second sliding block
214 first stopping block
215 second stopping block
216 elastic latch arm
217 terminal receiving groove group
218 terminal receiving groove
219 stopping member
220 elastic cantilevered arm
221 passageway
2211 first gap
2212 second gap
222 guiding rail
223 guiding groove
224 latching block
225 lock-releasing block
23 first terminal position assurance member
23' second terminal position assurance member
230 cover
231 partitioning plate
232 two-stage type latching structure
233 aperture
234 elastic latching arm
235 arm body
236 first latching hook
237 second latching hook
238 slidable connecting bar
239 first hook portion
240 second hook portion
241 barb
25 first terminal
25' second terminal
26 first conductive wire
26' second conductive wire
3 panel
30 inner peripheral surface
31 through-hole
32 engagement hole
4 fastener
D1 first direction
D2 second direction
D3 third direction

DETAILED DESCRIPTION

Before the present disclosure is described in detail, it is noted that the similar components are indicated by the same reference numerals in the following description.

Referring to FIG. 1, FIG. 2, FIG. 3 and FIG. 4, a first embodiment of an electrical connection device 100 of the present disclosure includes a through-type connector 1, a first cable-end connector 2 and a second cable-end connector 2'. The through-type connector 1 of the electrical connection device 100 is adapted to be assembled to a panel 3, and the through-type connector 1 is capable of being fixed to the panel 3 by two fasteners 4.

For sake of the later description, in the electrical connection device 100, a first direction D1, a second direction D2 which is perpendicular to the first direction D1 and a third direction D3 which is perpendicular to the first direction D1 and the second direction D2 are defined. In the first embodiment, the first direction D1 takes a front-rear direction as an example, a direction to which an arrow of FIG. 1 points is front and a direction opposite to front is rear; the second direction D2 takes a left-right direction as an example, a direction to which an arrow of FIG. 1 points is left and a direction opposite to left is right; and the third direction D3 takes an up-down direction as an example, a direction to which an arrow of FIG. 1 points is up and a direction opposite to up is down.

The panel 3 takes a cylinder body of a machine device as an example, but the present disclosure is not limited thereto. For example, the machine device is a starting device or a transmission device, the cylinder body is used to cover and protect internal components of the machine device. The panel 3 is formed with a through-hole 31 which extends along the first direction D1 and is used to allow the through-type connector 1 to pass through and two engagement holes 32 which are spaced apart from each other along the second direction D2 and are respectively positioned to a left side and a right side of the through-hole 31. The through-hole 31 is defined by an inner peripheral surface 30 of the panel 3. The engagement holes 32 are respectively used to allow the fasteners 4 to engage therewith. In the first embodiment, each engagement hole 32 takes a threaded hole as an example, each fastener 4 takes a screw as an example, the screw is used to be screwed to the corresponding engagement hole 32.

Referring to FIG. 3, FIG. 5, FIG. 6 and FIG. 7, the through-type connector 1 includes an outer shell 11, a mounting plate 13, a plurality of pins 14, an annular sealing ring 15, a sealing adhesive 16, and two bushings 17. The outer shell 11 is used to pass through the through-hole 31 of the panel 3. The outer shell 11 has a partitioning wall 110, a first peripheral wall 111 and a second peripheral wall 112. The partitioning wall 110 is formed with a plurality of penetrating holes 113 which are spaced apart from each other and extend along the first direction D1, the plurality of penetrating holes 113 are respectively used to allow the plurality of pins 14 to pass therethrough. The first peripheral wall 111 is connected to the partitioning wall 110, the first peripheral wall 111 and the partitioning wall 110 together define a first cavity 114 which are communicated with rear ends of the plurality of penetrating holes 113. The second peripheral wall 112 is connected to the partitioning wall 110 and is positioned in front of the first peripheral wall 111, the second peripheral wall 112 and the partitioning wall 110 together define a second cavity 115, the second cavity 115 has a filling groove 116 which is communicated with front ends of the plurality of penetrating holes 113.

Referring to FIG. 4, FIG. 5, FIG. 7 and FIG. 8, the first cavity 114 has a first independent insertion groove 117 and a second independent insertion groove 118 which are arranged along the second direction D2. The first independent insertion groove 117 is communicated with one part of the plurality of penetrating holes 113, the second independent insertion groove 118 is communicated with the other part of the plurality of penetrating holes 113. In the first embodiment, a shape of the first independent insertion groove 117 and a shape of the second independent insertion groove 118 are different. Specifically, the first independent insertion groove 117 and the second independent insertion groove 118 each have a first guiding groove portion 119, 120 which is adjacent to a bottom portion of the first peripheral wall 111 and two second guiding groove portions 121, 122 which are spaced apart from each other along the second direction D2 and are adjacent to a top portion of the first peripheral wall 111. Each first guiding groove portion 119, 120 is a long-groove shape which has a length direction to extend along the first direction D1. The first guiding groove portion 119 of the first independent insertion groove 117 and the first guiding groove portion 120 of the second independent insertion groove 118 are spaced apart from each other and are close to each other along the second direction D2, or the first guiding groove portion 119 of the first independent insertion groove 117 and the first guiding groove portion 120 of the second independent insertion groove 118 are spaced apart from each other and are away from each other along the second direction D2. The present first embodiment takes that the first guiding groove portions 119, 120 are spaced apart from each other and are close to each other along the second direction D2 as an example, but the present disclosure is not limited thereto, also may design the first guiding groove portions 119, 120 to be spaced apart from each other and are away from each other along the second direction D2 according to requirement. Each second guiding groove portion 121, 122 is a long-groove shape which has a length direction to extend along the first direction D1. One second guiding groove portion 121 of the two second guiding groove portions 121 and one second guiding groove portion 122 of the two second guiding groove portions 122 are spaced apart from each other and are close to each other along the second direction D2, and are respectively spaced apart from the first guiding groove portions 119, 120 along the third direction D3 and are respectively positioned above the first guiding groove portions 119, 120. The other second guiding groove portion 121 of the two second guiding groove portions 121 and the other second guiding groove portion 122 of the two second guiding groove portions 122 are spaced apart from each other and are away from each other along the second direction D2.

The first guiding groove portion 119 and the second guiding groove portions 121 of the first independent insertion groove 117 can function to provide alignment effect of the first cable-end connector 2 before insertion and provide guiding and sliding effect of the first cable-end connector 2 during insertion. The first guiding groove portion 120 and the second guiding groove portions 122 of the second independent insertion groove 118 can function to provide alignment effect of the second cable-end connector 2' before insertion and provide guiding and sliding effect of the second cable-end connector 2' during insertion.

Figure 3:
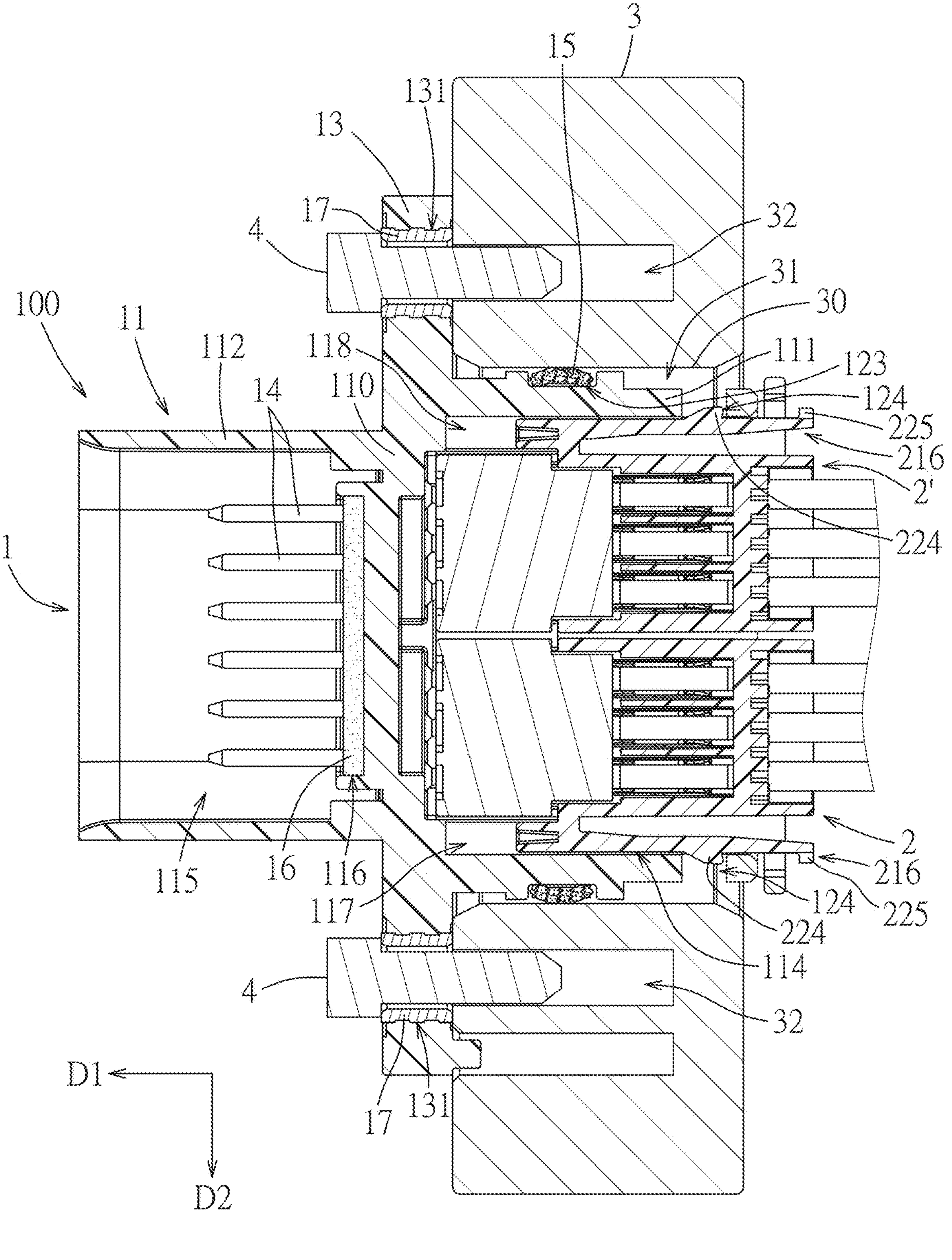
FIG. 3 is a cross sectional view taken along a line III-III of FIG. 1.
Figure 5:
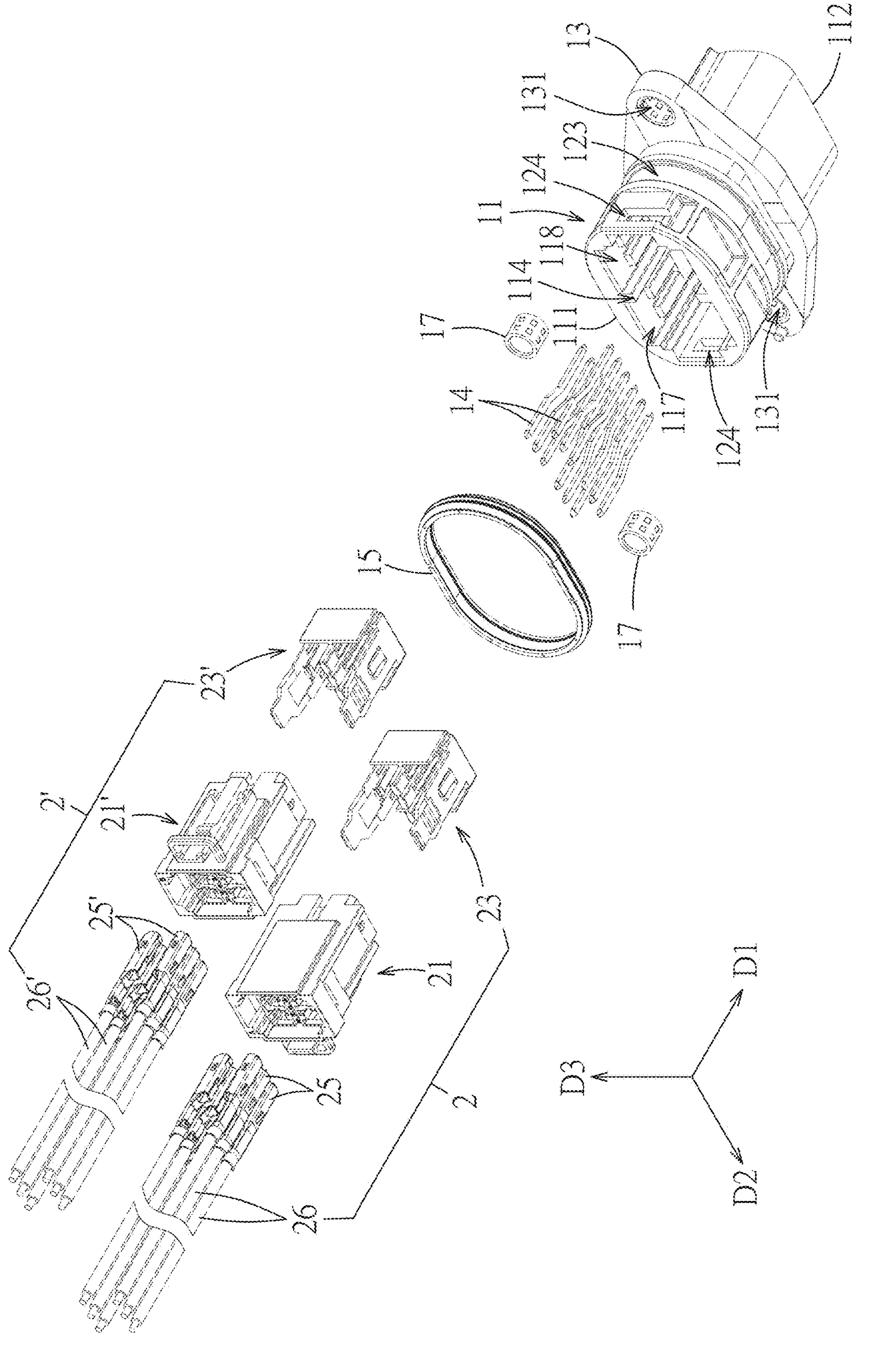
FIG. 5 is a perspective exploded view of the first embodiment.
Figure 6:
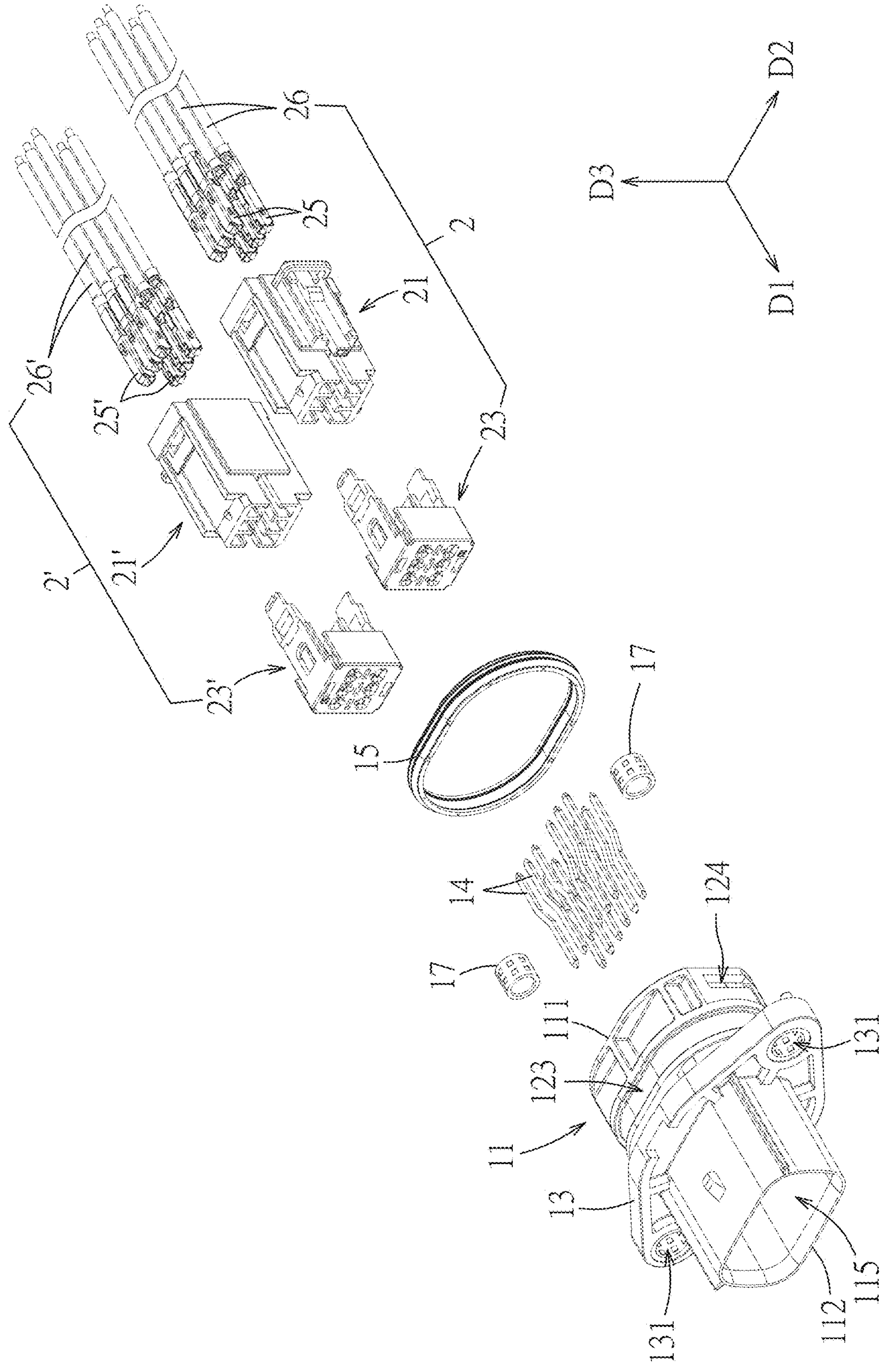
FIG. 6 is a perspective exploded view of the first embodiment viewed from another angle.

Referring to FIG. 3, FIG. 5 and FIG. 6, an outer surface of the first peripheral wall 111 of the outer shell 11 is recessed to form an annular groove 123, and the annular groove 123 is used to allow the annular sealing ring 15 to be received therein. The first peripheral wall 111 of the outer shell 11 is further formed with two latching grooves 124 which are spaced apart from each other along the second direction D2, the latching grooves 124 are respectively communicated with the first independent insertion groove 117 and the second independent insertion groove 118, the latching grooves 124 are respectively used to allow the first cable-end connector 2 and the second cable-end connector 2' to latch therewith.

The mounting plate 13 is integrally formed to an outer surface of the partitioning wall 110 of the outer shell 11, and is used to abut against the panel 3. The mounting plate 13 is formed with two mounting holes 131 which are spaced apart from each other along the second direction D2. The mounting holes 131 are capable of be respectively communicated with the engagement holes 32 of the panel 3, the mounting holes 131 are respectively used to allow the bushings 17 to be received therein and are respectively used to allow the fasteners 4 to pass therethrough.

Figure 7:
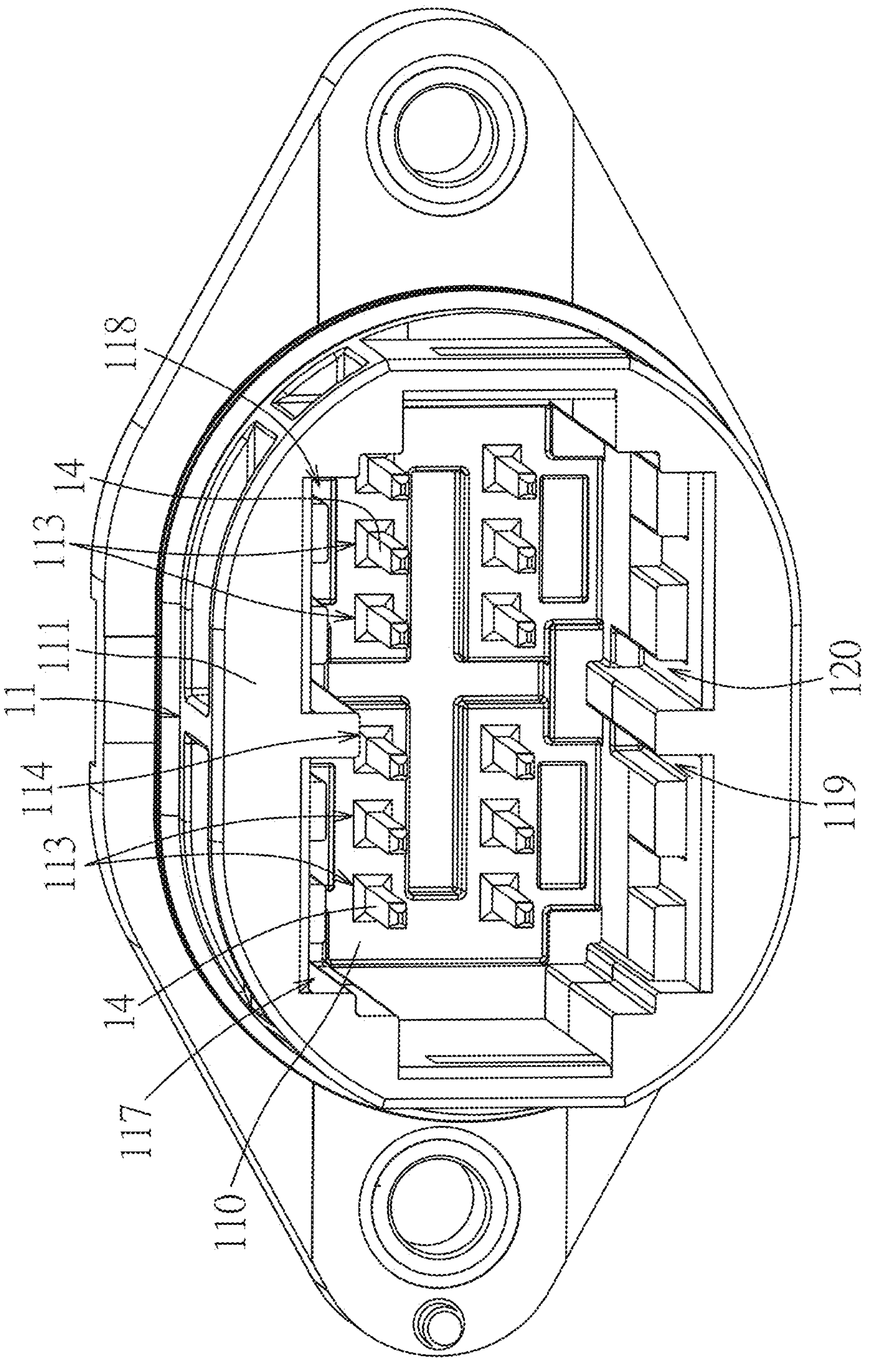
FIG. 7 is a perspective view of an outer shell of the first embodiment of the through-type connector.

Referring to FIG. 3, FIG. 5 and FIG. 7, each pin 14 is a conductive terminal which is made from metal material. Each pin 14 is used to pass through the corresponding penetrating hole 113 of the outer shell 11 so that two opposite ends of each pin 14 is capable of be respectively positioned in the first cavity 114 and the second cavity 115.

Referring to FIG. 3, FIG. 5 and FIG. 6, the annular sealing ring 15 is made from an elastic material, such as a silica gel or a rubber, the annular sealing ring 15 is provided to the annular groove 123 of the outer shell 11, and is used to abut against the inner peripheral surface 30 of the panel 3 so as to seal a gap between the first peripheral wall III of the outer shell 11 and the panel 3.

Figure 9:
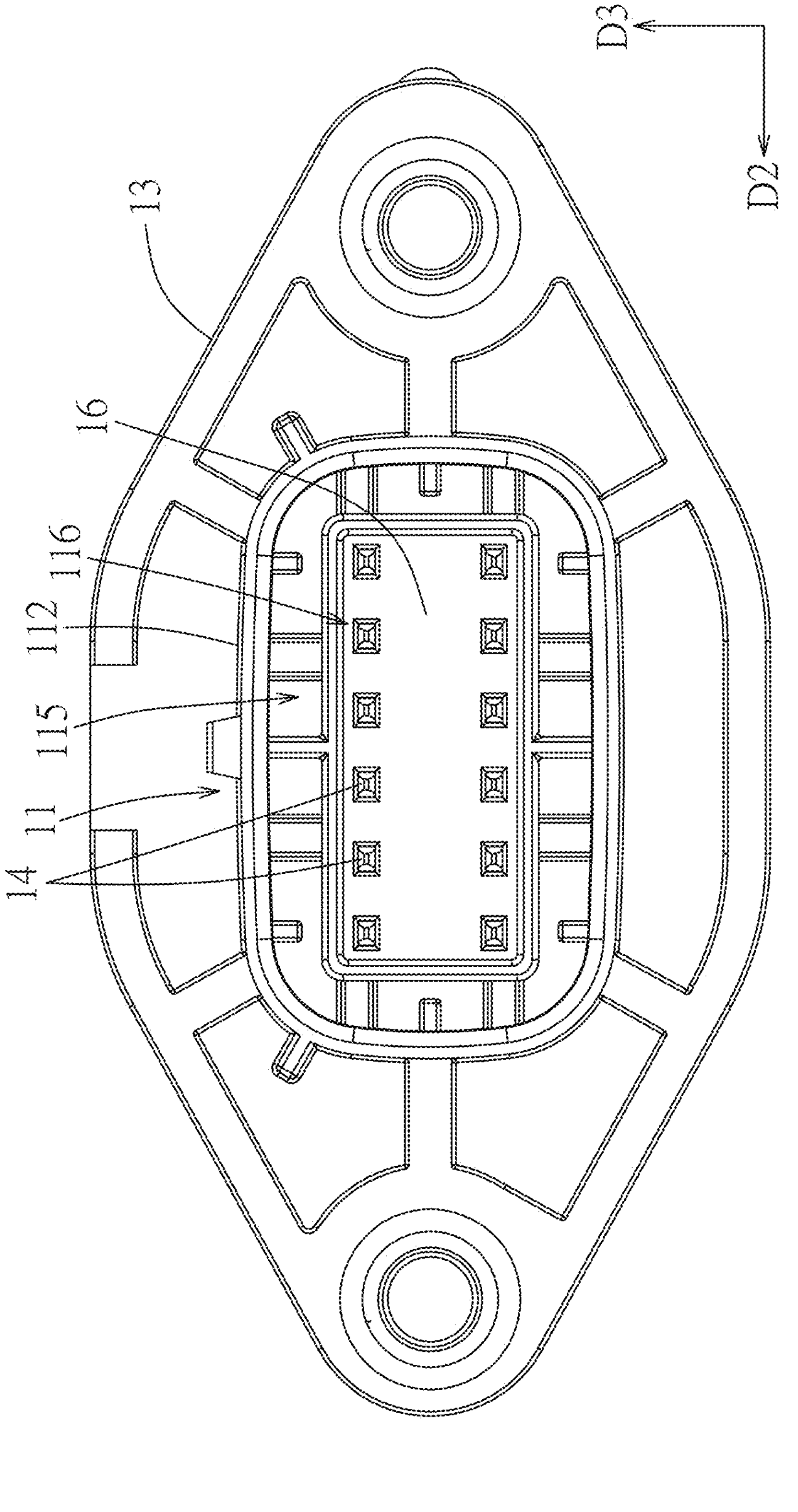
FIG. 9 is a front view of the first embodiment.

Referring to FIG. 3 and FIG. 9, the sealing adhesive 16 is used to be potted in at least one of the first cavity 114 and the second cavity 115 of the outer shell 11, is used to seal gaps between the outer shell 11 and the plurality of pins 14. In the first embodiment, that the sealing adhesive 16 is potted in the filling groove 116 of the second cavity 115 of the outer shell 11 is taken as an example, but the present disclosure is not limited thereto, it also may be that the sealing adhesive 16 is only potted in the first cavity 114, or that the sealing adhesive 16 is potted in the filling groove 116 of the second cavity 115 and the first cavity 114 at the same time according to requirement.

Referring to FIG. 3, FIG. 5 and FIG. 6, each bushing 17 is made from a metal material, and is used to be provided in the corresponding mounting hole 131 of the mounting plate 13. Each bushing 17 is used to allow the corresponding fastener 4 to pass therethrough.

Figure 4:
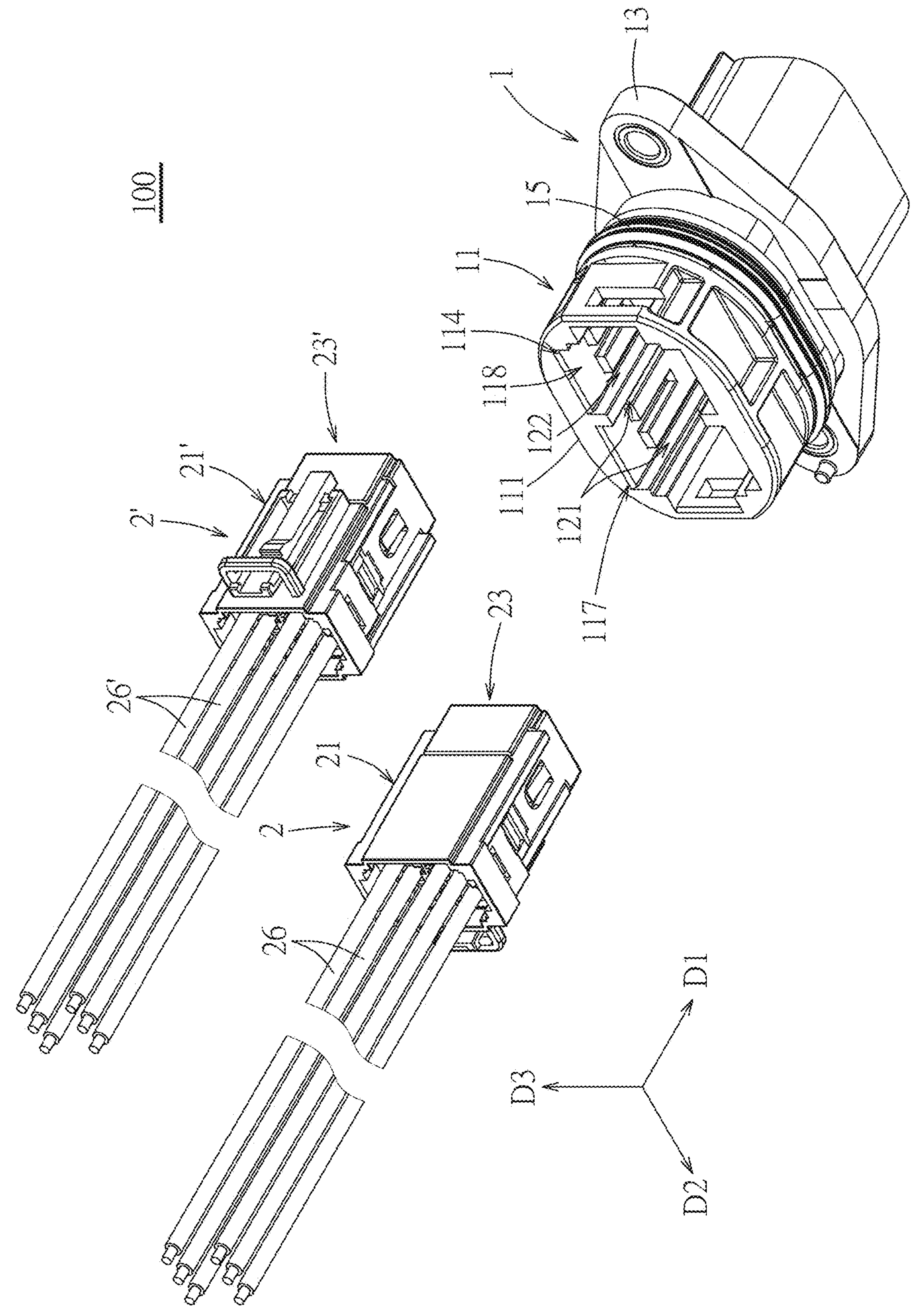
FIG. 4 is a perspective exploded view of the first embodiment illustrating an assembling relationship among a through-type connector, a first cable-end connector and a second cable-end connector.

Referring to FIG. 3, FIG. 4 and FIG. 9, when the through-type connector 1 is manufactured, firstly the plurality of pins 14 and the bushings 17 are placed into a mold (not shown). Next, the outer shell 11 and the mounting plate 13 are formed by for example over molding manner so that the outer shell 11 and the mounting plate 13 respectively cover the plurality of pins 14 and the bushings 17. Then, the annular sealing ring 15 sheathes the first peripheral wall 111 of the outer shell 11 and is received in the annular groove 123. Subsequently, the sealing adhesive 16 is potted into the filling groove 116 of the second cavity 115 of the outer shell 11, so as to make the sealing adhesive 16 cover each pin 14 to seal gaps between the outer shell 11 and the plurality of pins 14, so manufacturing of the through-type connector 1 is completed. By that the sealing adhesive 16 seals the gaps between the outer shell 11 and the plurality of pins 14, the sealing adhesive 16 is capable of functioning as good sealing effect to prevent a liquid, such as water or oil and the like, from permeating via the gaps between the outer shell 11 and the plurality of pins 14 to affect internal components covered by the panel 3.

Figure 2:
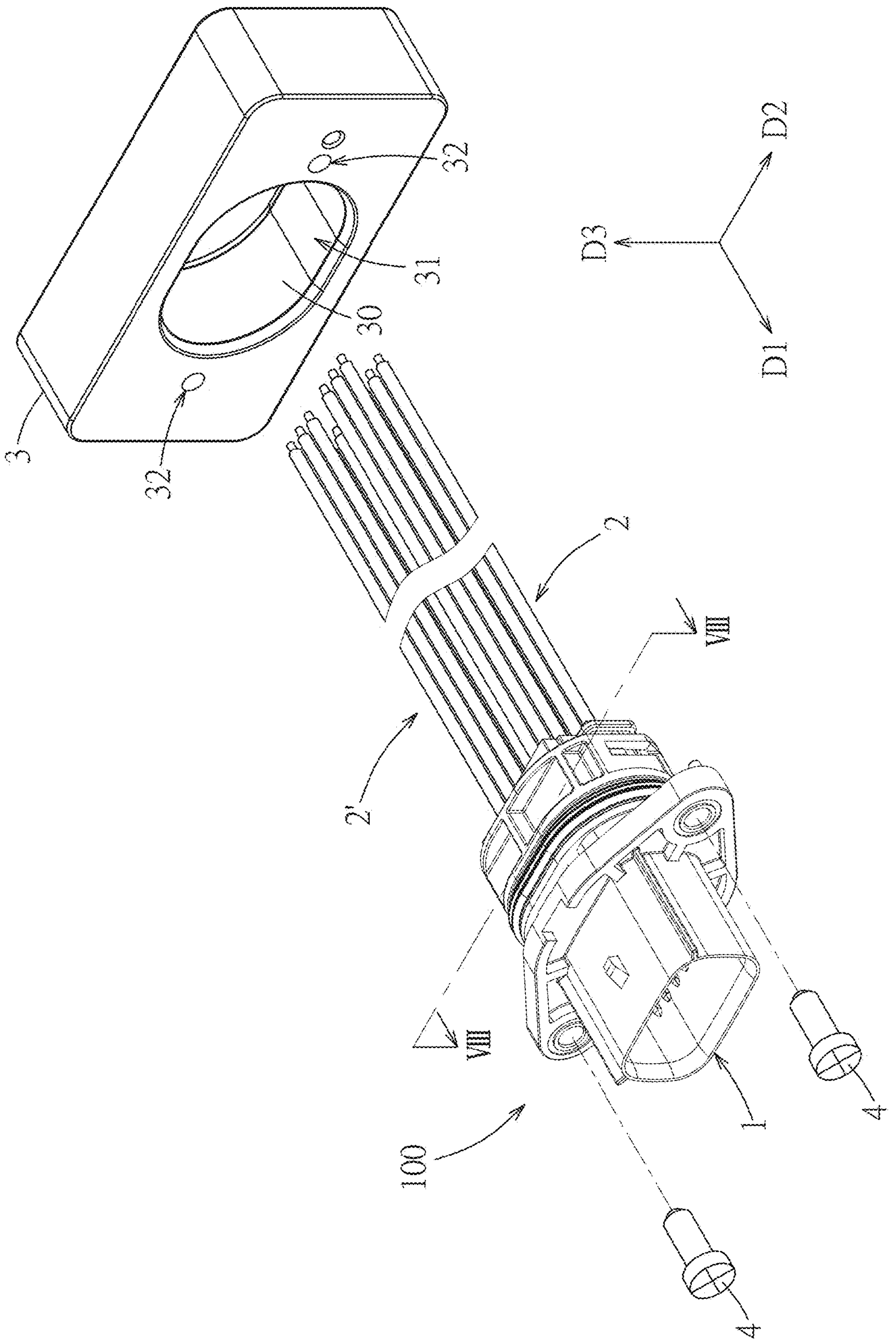
FIG. 2 is a perspective exploded view of the first embodiment and the panel.

Referring to FIG. 2 and FIG. 3, when the through-type connector 1 is assembled to the panel 3, firstly the first peripheral wall 111 of the outer shell 11 inserts into the through-hole 31. when the annular sealing ring 15 contacts the inner peripheral surface 30, the annular sealing ring will be squeezed and deformed, so that the annular sealing ring 15 is capable of tightly and forcingly contacting the first peripheral wall 111 and the inner peripheral surface 30 to seal the gap between the first peripheral wall 111 and the inner peripheral surface 30. When a surface of the mounting plate 13 abutting against the panel 3 is stopped by the panel 3, the through-type connector 1 cannot further move, at this time, the bushings 17 respectively correspond to the engagement holes 32 in position. Subsequently, each fastener 4 passes through and abuts against the corresponding bushing 17 and is screwed into the corresponding engagement hole 32, so that the mounting plate 13 can be locked to the panel 3 to make the through-type connector 1 fixed to the panel 3. By that the annular sealing ring 15 seals the gap between the first peripheral wall 111 of the outer shell 11 and the inner peripheral surface 30 of the panel 3, the annular sealing ring 15 is capable of functioning good sealing effect to prevent a liquid, such as water or oil and the like, from permeating via the gap between the first peripheral wall 111 of the outer shell 11 and the inner peripheral surface 30 of the panel 3 to affect the internal components covered by the panel 3. Moreover, by that the bushings 17 respectively are provided to the mounting holes 131 of the mounting plate 13, structure strength of the mounting plate 13 can be increased, and contacting and friction of the fastener 4 with the mounting plate 13 and in turn damage of the mounting plate 13 can be prevented.

It is noted that, in the present first embodiment, the engagement hole 32, the mounting hole 131, the bushing 17 and the fastener 4 also may be each set as one in number as desired, and are not limed to each be set as two in number.

Referring to FIG. 4, FIG. 5 and FIG. 6, the first cable-end connector 2 is an independent connector, and is provided so that the first cable-end connector 2 is capable of independently inserting into the first independent insertion groove 117 of the first cavity 114. The first cable-end connector 2 includes a first insulative housing 21, a first terminal position assurance (TPA) member 23, a plurality of first terminals 25 and a plurality of first conductive wires 26.

Referring to FIG. 8, FIG. 10, FIG. 11, FIG. 12 and FIG. 13, the first insulative housing 21 has a housing body 210, two guiding rail groups 211, a first sliding block 212, two second sliding blocks 213, two first stopping blocks 214, two second stopping blocks 215 and an elastic latch arm 216. The housing body 210 is formed with a plurality of terminal receiving groove groups 217 which are arranged along the second direction D2, each terminal receiving groove group 217 has two terminal receiving grooves 218 which are spaced apart from each other along the third direction D3. Each terminal receiving groove 218 is used to allow the corresponding first terminal 25 to be received therein. The housing body 210 has a plurality of stopping members 219 which are arranged along the second direction D2. Each stopping member 219 has two elastic cantilevered arms 220 which are inversely provided along the third direction D3, each elastic cantilevered arm 220 extends into the corresponding terminal receiving groove 218 and is used to stop the corresponding first terminal 25 to prevent the first terminal 25 from moving rearwardly along the first direction D1 to move away from the corresponding terminal receiving groove 218. The housing body 210 is further formed with a passageway 221. The passageway 221 has a first gap 2211 which is between the terminal receiving grooves 218 of each terminal receiving groove group 217 and a second gap 2212 which is between the elastic cantilevered arms 220 of each stopping member 219.

The two guiding rail groups 211 are inversely provided to atop end and a bottom end of the housing body 210 along the third direction D3 respectively. Each guiding rail group 211 has two guiding rails 222 which are spaced apart from each other along the second direction D2 and are respectively adjacent to a left side and a right side of the housing body 210, an inner side of each guiding rail 222 is recessed to form a guiding groove 223 which extends along the first direction D1.

The first sliding block 212 protrudes from a bottom end of the corresponding guiding rail 222 positioned to a right side of the guiding rail group 211 which is positioned to the bottom end of the housing body 210, and the first sliding block 212 is adjacent to a right side of the housing body 210. The first sliding block 212 is a long block shape which has a length direction to extend along the first direction D1, the first sliding block 212 is used to be slidably connected to the first guiding groove portion 119 of the first independent insertion groove 117. The second sliding blocks 213 respectively protrude from top ends of the guiding rails 222 of the guiding rail group 211 which is positioned at the top end of the housing body 210, and the second sliding blocks 213 are respectively adjacent to the left side and the right side of the housing body 210. The corresponding second sliding block 213 positioned to the right side of the housing body 210 is spaced apart from the first sliding block 212 along the third direction D3 and is positioned above the first sliding block 212. Each second sliding block 213 is a long block shape which has a length direction to extend along the first direction D1, each second sliding block 213 is used to be slidably connected to the corresponding second guiding groove portion 121 of the first independent insertion groove 117.

The first stopping blocks 214 are inversely provided to the top end and the bottom end of the housing body 210 along the third direction D3 respectively and are adjacent to a front end of the housing body 210. The second stopping blocks 215 are inversely provided along the third direction D3. The second stopping block 215 positioned to the bottom end of the housing body 210 is connected to a bottom end of the corresponding guiding rail 222 and an inner side of the first sliding block 212, the second stopping block 215 is spaced apart from the bottom end of the housing body 210 and is adjacent to a rear end of the housing body 210. The second stopping block 215 positioned to the top end of the housing body 210 is connected to inner sides of the second sliding blocks 213, the second stopping block 215 is spaced apart from the top end of the housing body 210 and is adjacent to the rear end of the housing body 210. Each first stopping block 214 and the corresponding second stopping block 215 are spaced apart from each other along the first direction D1.

Referring to FIG. 3, FIG. 10, FIG. 11 and FIG. 14, the elastic latch arm 216 is integrally connected to a left side surface of the housing body 210 and has a latching block 224 and two lock-releasing blocks 225 which are spaced apart from each other along the first direction D1. The latching block 224 is used to latch into the corresponding latching groove 124 of the outer shell 11 so that the first cable-end connector 2 is in a locked state relative to the through-type connector 1. The lock-releasing blocks 225 are spaced apart from each other along the third direction D3 and are positioned behind the latching block 224, the lock-releasing blocks 225 are used to allow a finger of a user to press down thereon so as to make the elastic latch arm 216 deflected and in turn force the latching block 224 to move away from the corresponding latching groove 124, so that the first cable-end connector 2 is switched from the locked state to a locking-released state. Moreover, the lock-releasing blocks 225 are further used to allow the finger of the user to apply a force to pull the lock-releasing blocks 225 rearwardly, the lock-releasing blocks 225 bring the first cable-end connector 2 in the locking-released state to move rearwardly and to move away from the first independent insertion groove 117. By a design manner that the lock-releasing block 225 is two in number, a larger pressing area can be provided to the finger of the user for pressing down the lock-releasing blocks 225, and a larger pulling area can be provided to the finger of the user for pulling the lock-releasing blocks 225, so convenience on use operation can be promoted. It is noted that, the lock-releasing block 225 also may be designed as one in number as desired, but is not limited to two in number.

Figure 10:
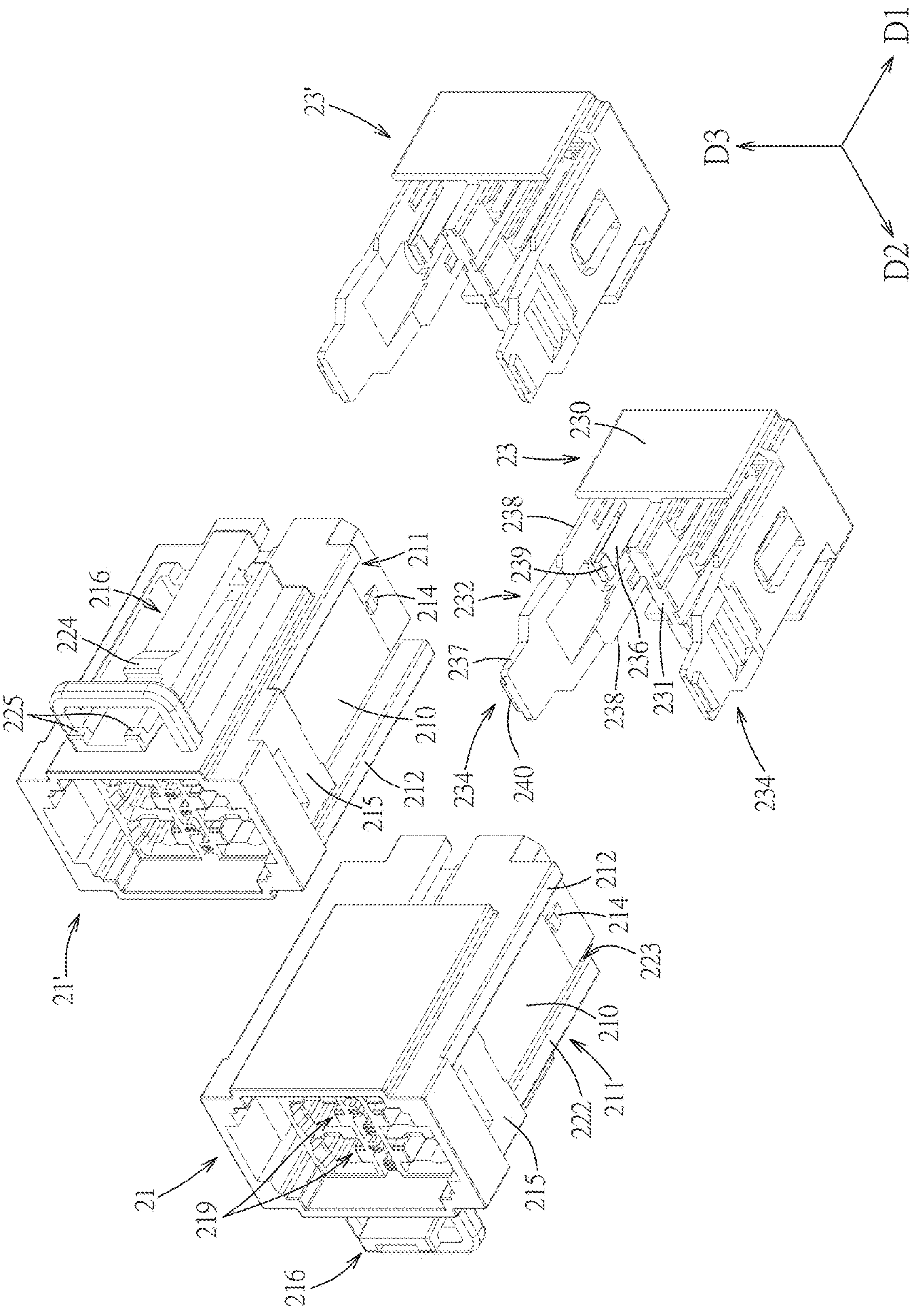
FIG. 10 is a partial enlarged view of FIG. 5.
Figure 11:
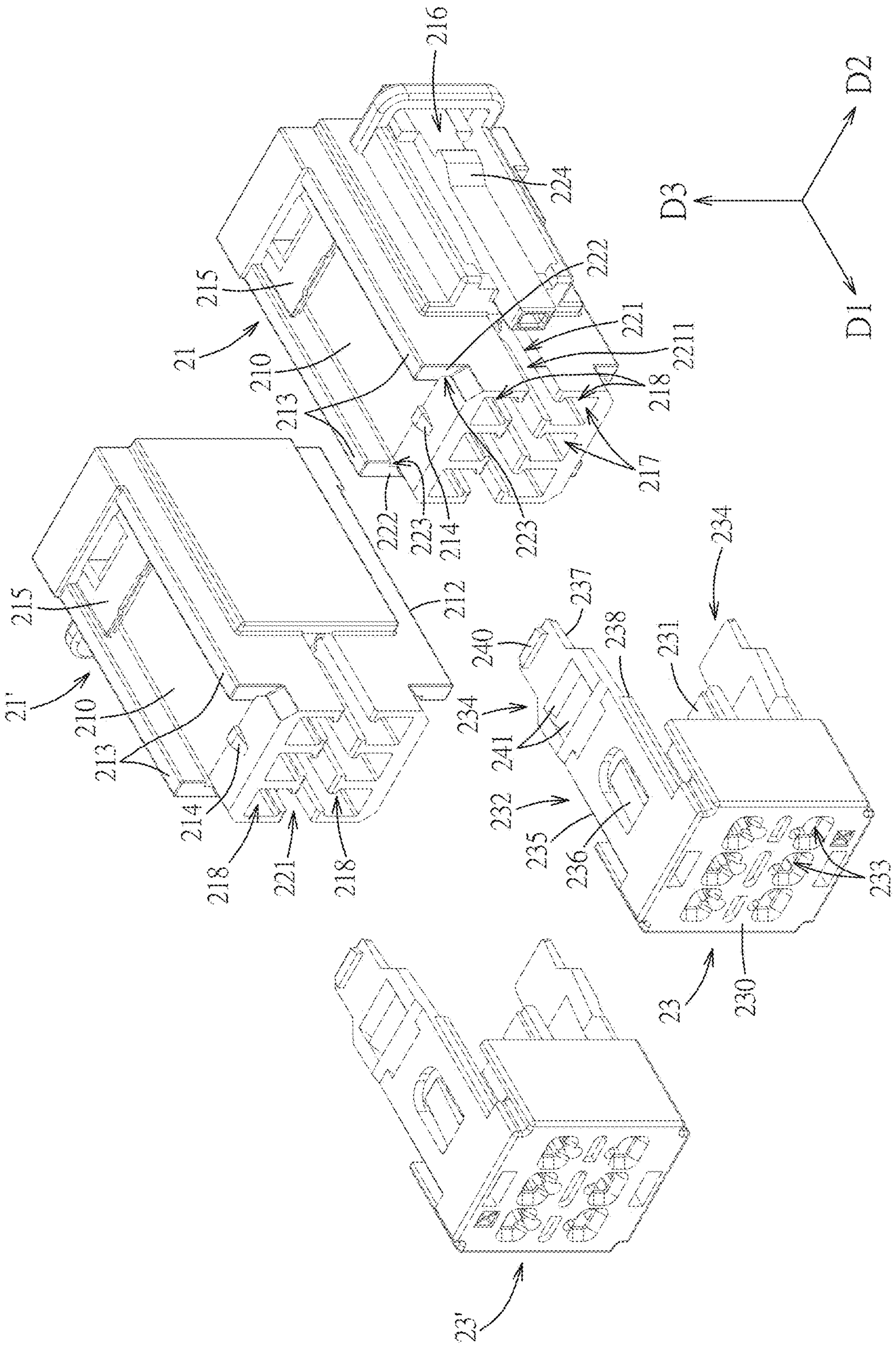
FIG. 11 is a partial enlarged view of FIG. 6.
Figure 12:
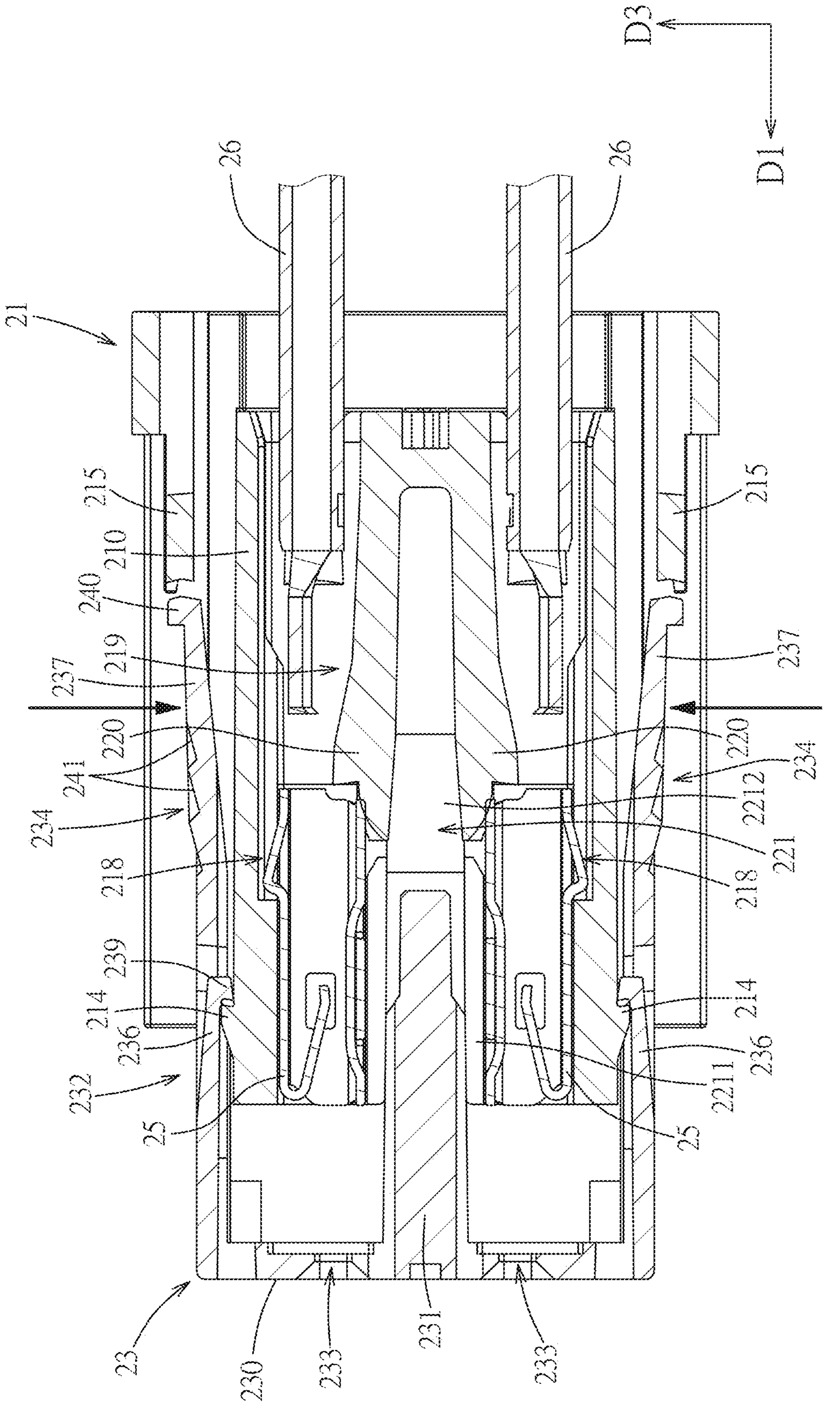
FIG. 12 is a cross sectional view of the first cable-end connector of the first embodiment illustrating that a first terminal position assurance member is positioned to a pre-latching position.
Figure 13:
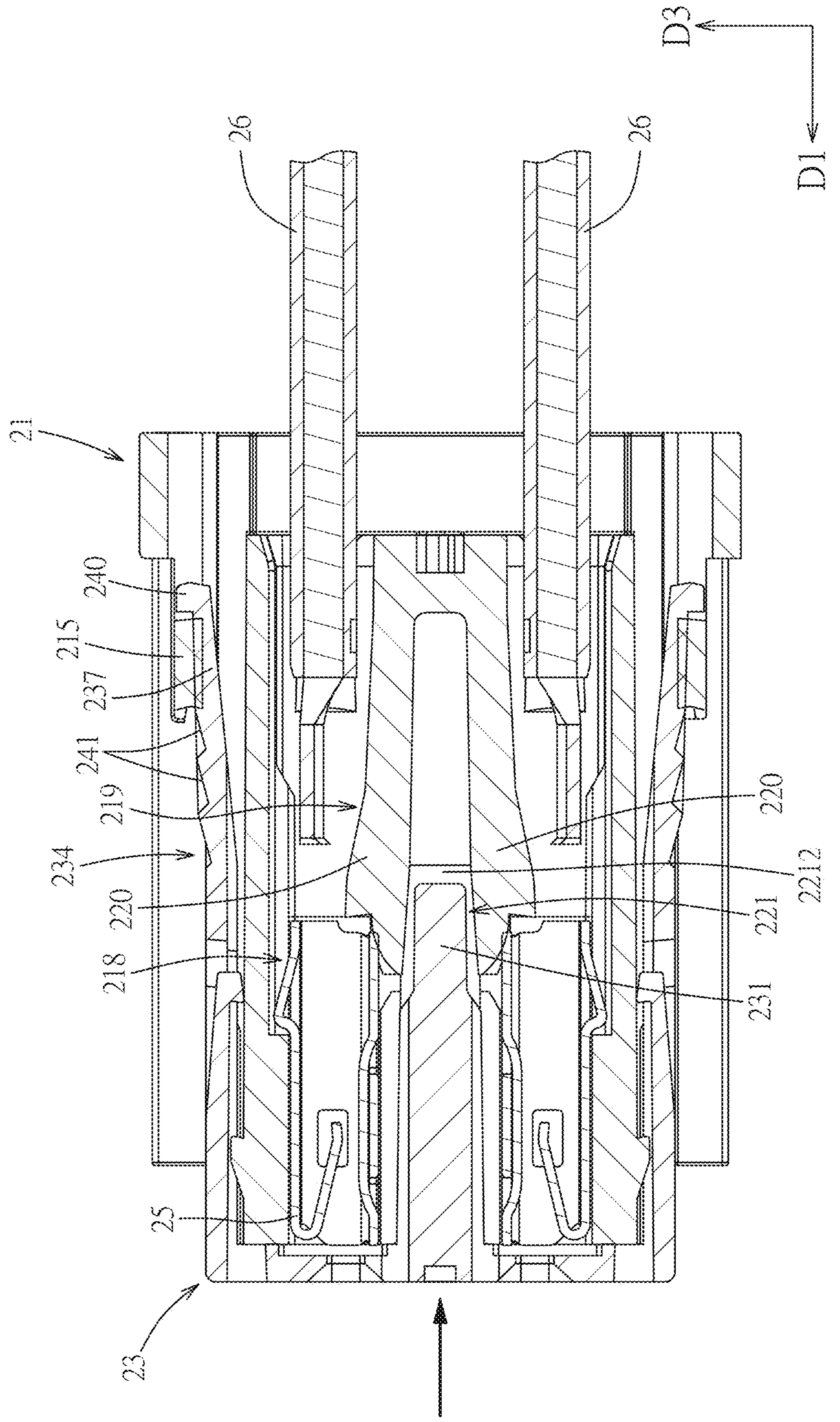
FIG. 13 is a cross sectional view of the first cable-end connector of the first embodiment illustrating that the first terminal position assurance member is positioned to a final-latching position.
Figure 14:
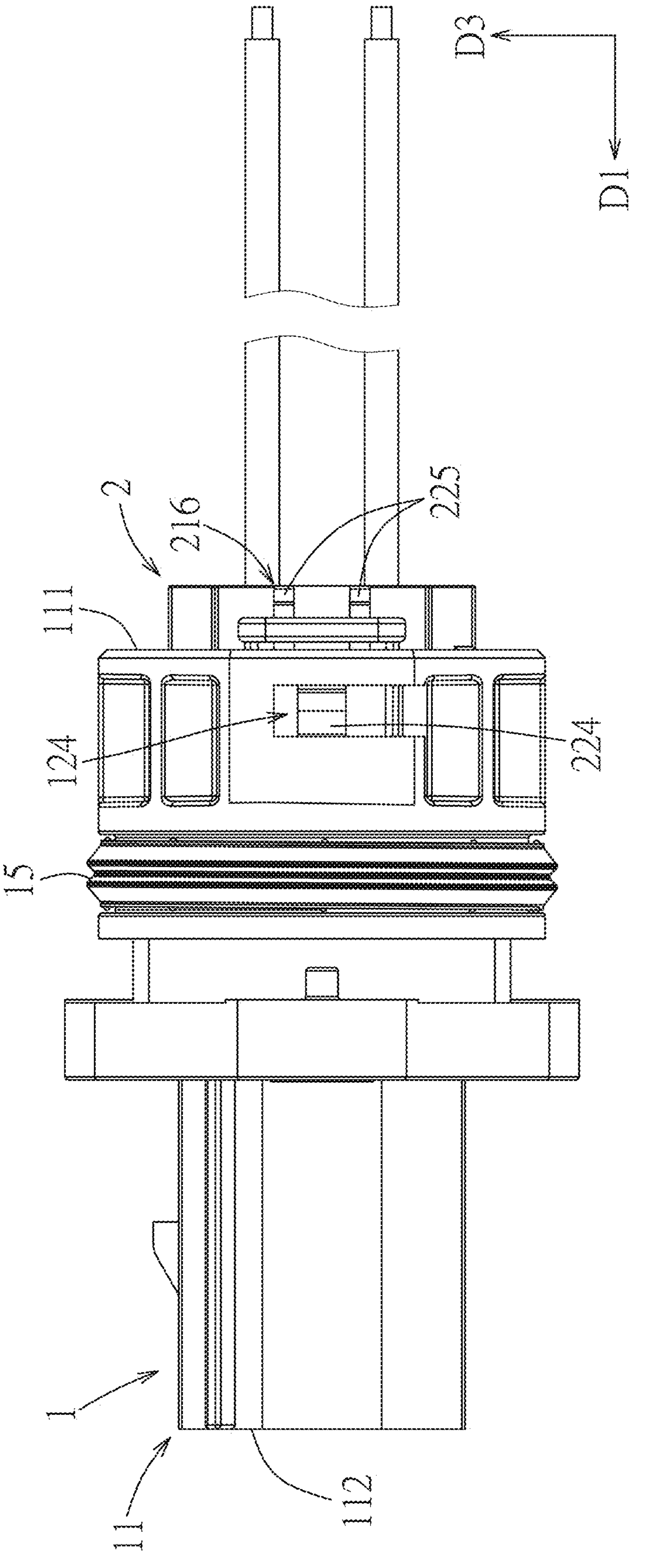
FIG. 14 is a side view of the first embodiment.

Referring to FIG. 10, FIG. 11, FIG. 12 and FIG. 13, the first terminal position assurance member 23 has a cover 230, a partitioning plate 231 and one two-stage type latching structure 232. The cover 230 is used to cover a front end portion of the housing body 210 of the first insulative housing 21. The cover 230 is formed with a plurality of apertures 233 which are capable of being respectively communicated with the plurality of terminal receiving grooves 218, each aperture 233 is used to allow the corresponding pin 14 (as shown in FIG. 6) to pass therethrough so that the pin 14 is capable of inserting into the corresponding terminal receiving groove 218 via the corresponding aperture 233 and being connected with the corresponding first terminal 25. The partitioning plate 231 is formed in the cover 230, the partitioning plate 231 is used to extend into the passageway 221 of the first insulative housing 21 to partition the elastic cantilevered arms 220 of each stopping member 219. The two-stage type latching structure 232 is provided to the cover 230, and is capable of latching to the first insulative housing 21 in a two-stage type latching manner, so, when the first terminal position assurance member 23 moves along the first direction D1 relative to the first insulative housing 21, the first terminal position assurance member 23 is capable of being selectively positioned to a pre-latching position (as shown in FIG. 12) and a final-latching position (as shown in FIG. 13) by means of the two-stage type latching structure 232.

Specifically, the two-stage type latching structure 232 includes two elastic latching arms 234 which are inversely provided to a top side and a bottom side of the cover 230 along the third direction D3. Each elastic latching arm 234 extends along the first direction D1 and has an arm body 235, a first latching hook 236 and a second latching hook 237. The arm body 235 is connected to the cover 230 and has two slidable connecting bars 238 which are spaced apart from each other along the second direction D2, each slidable connecting bar 238 is used to be slidably connected into the guiding groove 223 of the corresponding guiding rail 222 along the first direction D1. By that each slidable connecting bar 238 and the corresponding guiding groove 223 cooperate with each other, a moving direction of the first terminal position assurance member 23 can be guided so that the first terminal position assurance member 23 is capable of smoothly moving to the pre-latching position or the final-latching position. The first latching hook 236 is positioned in an opened groove formed by the arm body 235. A front end of the first latching hook 236 is connected to the arm body 235, the first latching hook 236 has a first hook portion 239 which is adjacent to a rear end of the first latching hook 236 and is toward the partitioning plate 231, the first hook portion 239 is used to latch to the corresponding first stopping block 214 so that the first terminal position assurance member 23 is positioned to the pre-latching position. The second latching hook 237 extends rearwardly from a rear end of the arm body 235 and is spaced apart from the first latching hook 236 along the first direction D1 is positioned behind the first latching hook 236. The second latching hook 237 has a second hook portion 240 which is adjacent to a rear end of the second latching hook 237 and is toward a side away from the partitioning plate 231, the second hook portion 240 is used to latch to the corresponding second stopping block 215, so that the first terminal position assurance member 23 is positioned to the final-latching position. A side of the second latching hook 237 away from the partitioning plate 231 has a plurality of barbs 241 which are arranged along the first direction D1 and are positioned between the first latching hook 236 and the second hook portion 240.

Each first terminal 25 is used to be received in the corresponding terminal receiving groove 218, and each first terminal 25 is used to electrically connect the corresponding pin 14 (as shown in FIG. 6). Each first conductive wire 26 is connected to the corresponding first terminal 25.

When the constituent components of the first cable-end connector 2 are assembled, firstly any one of the elastic latching arms 234 is aligned with the corresponding guiding rail group 211 of the first insulative housing 21. Then, the first terminal position assurance member 23 is moved rearwardly along the first direction D1, so that each slidable connecting bar 238 is slidably connected into the guiding groove 223 of the corresponding guiding rail 222. At this time, the partitioning plate 231 extends into the first gap 2211 of the passageway 221. Because the elastic latching arms 234 of the two-stage type latching structure 232 are inversely provided along the third direction D3 to form a symmetric structure, only any one of the elastic latching arms 234 is aligned with the corresponding guiding rail group 211 of the first insulative housing 21, can subsequent assembling operation be performed, so convenience of an operation that the first terminal position assurance member 23 is assembled to the first insulative housing 21 can be promoted.

In a process that each elastic latching arm 234 moves rearwardly along the first direction D1, when the first hook portion 239 of the first latching hook 236 of each elastic latching arm 234 contacts the corresponding first stopping block 214, the first latching hook 236 will be pushed outwardly and deformed and accumulate an elastic force. When the first hook portion 239 of the first latching hook 236 passes over the corresponding first stopping block 214, the first latching hook 236 rebounds and restores by means of the accumulated elastic force so that the first hook portion 239 automatically latches to the corresponding first stopping block 214 and in turn the first terminal position assurance member 23 is positioned to the pre-latching position. At this time, the partitioning plate 231 does not extend into the second gap 2212 of the passageway 221.

When the first terminal position assurance member 23 is positioned to the pre-latching position, each first terminal 25 is moved forwardly from a rear side of the first insulative housing 21 along the first direction D1 and is inserted into the corresponding terminal receiving groove 218. In a process that the first terminal 25 is moved forwardly, when the first terminal 25 contacts the corresponding elastic cantilevered arm 220, the elastic cantilevered arm 220 will be pushed outwardly and be deformed to enter into the second gap 2212. When the first terminal 25 is moved to a position as shown in FIG. 12, the first terminal 25 cannot be further moved forwardly, at this time, the elastic cantilevered arm 220 rebounds and restores by means of an accumulated elastic force when the elastic cantilevered arm 220 is deformed, so as to automatically stop the first terminal 25 to prevent the first terminal 25 from rearwardly moving.

After assembling of the plurality of first terminals 25 is completed, a force is applied to press down the second latching hook 237 of each elastic latching arm 234 to move the second latching hook 237 of each elastic latching arm 234 inwardly so that the second latching hook 237 of each elastic latching arm 234 is deformed and accumulates an elastic force, and so that the second hook portion 240 of the second latching hook 237 avoids blocking of the corresponding second stopping block 215. Then, the first terminal position assurance member 23 is moved rearwardly along the first direction D1, so that the second hook portion 240 is moved along an inner side of the corresponding second stopping block 215. When the second hook portion 240 of the second latching hook 237 passes over the corresponding second stopping block 215, the second latching hook 237 rebounds and restores by means of the accumulated elastic force to make the second hook portion 240 automatically latch to the corresponding second stopping block 215, so that the first terminal position assurance member 23 is positioned to the final-latching position. At this time, the partitioning plate 231 extends into the second gap 2212 of the passageway 221 and partitions and stops the elastic cantilevered arms 220. Therefore, the partitioning plate 231 can function to prevent any one of the elastic cantilevered arms 220 from being affected due to vibration or other factor to move away from a position of stopping the corresponding first terminal 25, so as to assure the plurality of first terminals 25 can be firmly respectively positioned to the plurality of terminal receiving grooves 218.

When the first terminal 25 will be pulled out from the corresponding terminal receiving groove 218, a force is applied to press down the plurality of barbs 241 of the second latching hook 237 of each elastic latching arm 234, the second latching hook 237 is pushed inwardly and deformed and accumulates an elastic force and in turn makes the second hook portion 240 move away from the corresponding second stopping block 215. Then, a force is applied to pull the plurality of barbs 241 of the second latching hook 237 forwardly along the first direction D1, so as to make the first terminal position assurance member 23 return to the pre-latching position, the partitioning plate 231 move away from the second gap 2212 of the passageway 221. At this time, a user employs a tool to push the corresponding elastic cantilevered arm 220 to move the corresponding elastic cantilevered arm 220 so as to make the corresponding elastic cantilevered arm 220 move away from the position of stopping the corresponding first terminal 25, then the first terminal 25 can be pulled rearwardly so as to make the first terminal 25 move away from the corresponding terminal receiving groove 218. By a design of the plurality of barbs 241 of the second latching hook 237, a friction force can be increased when the finger of the user contacts the second latching hook 237, so that the user can conveniently and rapidly pull the first terminal position assurance member 23 forwardly, convenience of the operation can be promoted.

Referring to FIG. 4, FIG. 5 and FIG. 6, the second cable-end connector 2' is an independent connector, and a shape of the second cable-end connector 2' is different from a shape of the first cable-end connector 2. The second cable-end connector 2' is provided so that the second cable-end connector 2' is capable of independently inserting into the second independent insertion groove 118 of the first cavity 114. A structure of the second cable-end connector 2' is similar to the structure of the first cable-end connector 2 and includes a second insulative housing 21', a second terminal position assurance member 23' which is provided to the second insulative housing 21', a plurality of second terminals 25' which are provided to the second insulative housing 21' and are used to respectively electrically connect the corresponding pins 14 and a plurality of second conductive wires 26' which are respectively connected to the plurality of second terminals 25'. Because the second cable-end connector 2' only has a structure of the second insulative housing 21' to be different from the structure of the first insulative housing 21 of the first cable-end connector 2, structures of the second terminal position assurance member 23', the plurality of second terminals 25' and the plurality of second conductive wires 26' of the second cable-end connector 2' are respectively the same as the structures of the first terminal position assurance member 23, the plurality of first terminals 25 and the plurality of first conductive wires 26 of the first cable-end connector 2, and an assembling manner between the constituent components of the second cable-end connector 2' also are the same as the assembling manner between the constituent components of the first cable-end connector 2, so only difference of the second insulative housing 21' from the first insulative housing 21 is described below.

Figure 8:
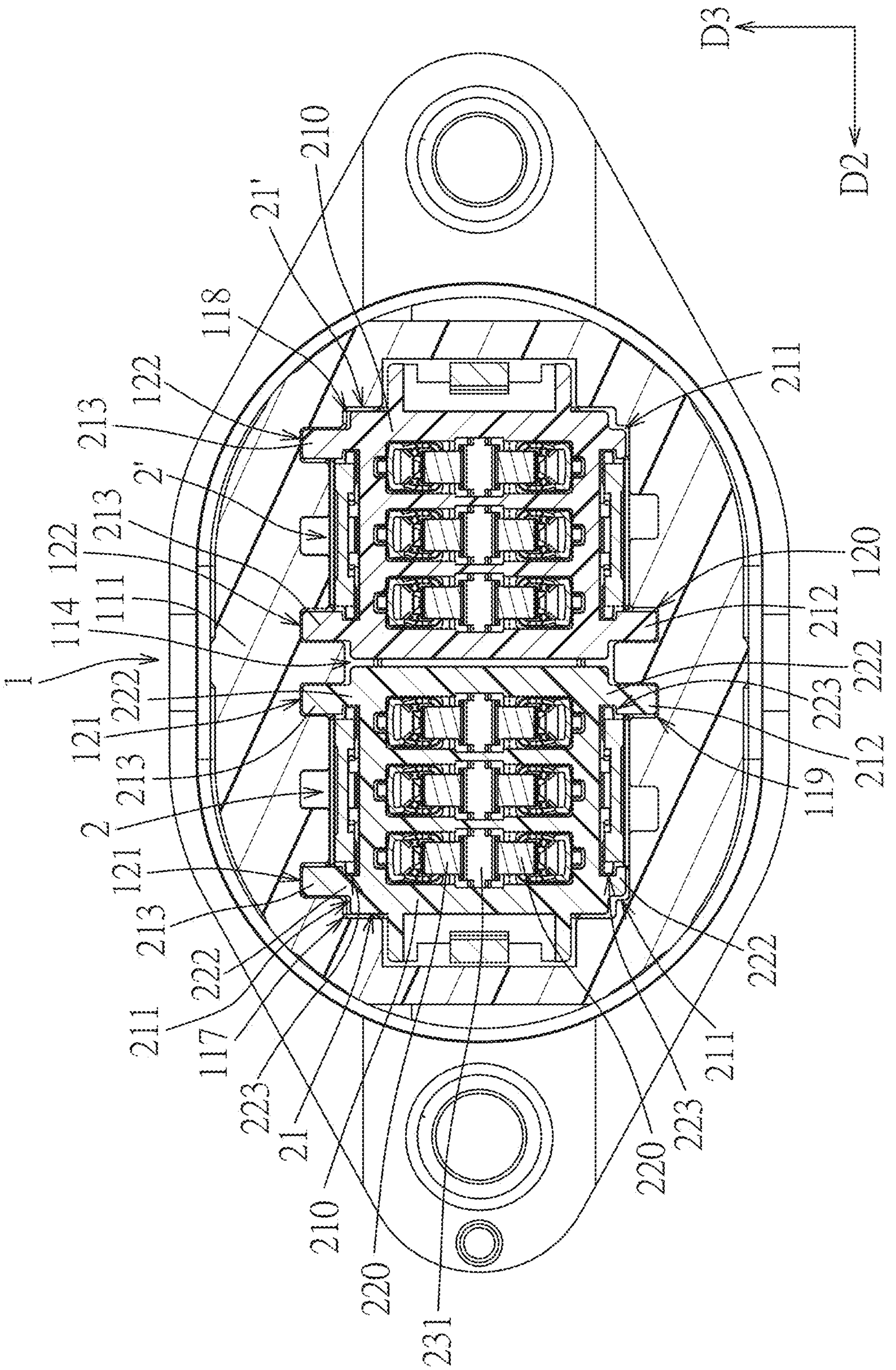
FIG. 8 is a cross sectional view taken along a line VIII-VIII of FIG. 2.

Referring to FIG. 8, FIG. 10 and FIG. 11, the second insulative housing 21' similarly has a housing body 210, two guiding rail groups 211, a first sliding block 212, two second sliding blocks 213, two first stopping blocks 214, two second stopping blocks 215 and an elastic latch arm 216. One of differences of the second insulative housing 21' from the first insulative housing 21 lies in that a providing position of the first sliding block 212 is different. The first sliding block 212 of the second insulative housing 21' protrudes from a bottom end of the guiding rail 222 positioned to a left side of the guiding rail group 211 which is positioned to the bottom end of the housing body 210, and the first sliding block 212 of the second insulative housing 21' is adjacent to a left side of the housing body 210, the first sliding block 212 is used to be slidably connected to the first guiding groove portion 120 of the second independent insertion groove 118. Another of the differences of the second insulative housing 21' from the first insulative housing 21 lies in that a providing position of the elastic latch arm 216 is different. The elastic latch arm 216 of the second insulative housing 21' is integrally connected to a right side surface of the housing body 210.

Referring to FIG. 3, FIG. 4 and FIG. 8, when the first cable-end connector 2 is assembled to the through-type connector 1, firstly the first sliding block 212 and the second sliding blocks 213 of the first cable-end connector 2 are respectively aligned with the first guiding groove portion 119 and the second guiding groove portions 121 of the first independent insertion groove 117. Next, the first cable-end connector 2 is moved forwardly along the first direction D1, so that the first sliding block 212 and the second sliding blocks 213 respectively extend into the first guiding groove portion 119 and the second guiding groove portions 121, and respectively slide along the first guiding groove portion 119 and the second guiding groove portions 121. When the latching block 224 of the elastic latch arm 216 contacts an inner edge of the first peripheral wall 111 of the outer shell 11, the elastic latch arm 216 will be squeezed by the first peripheral wall 111 to be deflected inwardly and deformed and accumulate an elastic force. When the latching block 224 of the elastic latch arm 216 is moved to a position where the latching block 224 of the elastic latch arm 216 is aligned with the corresponding latching groove 124, the elastic latch arm 216 rebounds and restores by means of the accumulated elastic force so that the latching block 224 automatically latches to the corresponding latching groove 124, in turn the first cable-end connector 2 is in a locked state that the first cable-end connector 2 is locked to the through-type connector 1. At this time, the corresponding pins 14 of the through-type connector 1 respectively pass through the plurality of apertures 233 of the first cable-end connector 2 (as shown in FIG. 11) to be electrically connected to the plurality of first terminals 25 respectively. By that the first sliding block 212 and the second sliding blocks 213 respectively extends into the first guiding groove portion 119 and the second guiding groove portions 121, shaking of the first cable-end connector 2 along the second direction D2 or the third direction D3 can be prevented, so that the first cable-end connector 2 can be firmly positioned in the first independent insertion groove 117.

When the second cable-end connector 2' is assembled to the through-type connector 1, firstly the first sliding block 212 and the second sliding blocks 213 of the second cable-end connector 2' are respectively aligned with the first guiding groove portion 120 and the second guiding groove portions 122 of the second independent insertion groove 118. Next, the second cable-end connector 2' is moved forwardly along the first direction D1, so that the first sliding block 212 and the second sliding blocks 213 respectively extend into the first guiding groove portion 120 and the second guiding groove portions 122, and respectively slide along the first guiding groove portion 120 and the second guiding groove portions 122. When the latching block 224 of the elastic latch arm 216 contacts an inner edge of the first peripheral wall 111 of the outer shell 11, the elastic latch arm 216 will be squeezed by the first peripheral wall 111 to be deflected inwardly and deformed and accumulate an elastic force. When the latching block 224 of the elastic latch arm 216 is moved to a position where the latching block 224 of the elastic latch arm 216 is aligned with the corresponding latching groove 124, the elastic latch arm 216 rebounds and restores by means of the accumulated elastic force so that the latching block 224 automatically latches to the corresponding latching groove 124, in turn the second cable-end connector 2' is in a locked state that the second cable-end connector 2' is locked to the through-type connector 1. At this time, the corresponding pins 14 of the through-type connector 1 respectively pass through the plurality of apertures 233 (as shown in FIG. 11) of the second cable-end connector 2' to be respectively electrically connected to the plurality of second terminals 25'. By that the first sliding block 212 and the second sliding blocks 213 respectively extends into the first guiding groove portion 120 and the second guiding groove portions 122, shaking of the second cable-end connector 2' along the second direction D2 or the third direction D3 can be prevented, so that the second cable-end connector 2' can be firmly positioned in the second independent insertion groove 118.

By the positional design of the first guiding groove portion 119 and the second guiding groove portions 121 of the first independent insertion groove 117 and the positional design of the first guiding groove portion 120 and the second guiding groove portions 122 of the second independent insertion groove 118, the shape of the first independent insertion groove 117 and the shape of the second independent insertion groove 118 are different. By the positional design of the first sliding block 212 and the second sliding blocks 213 of the first insulative housing 21 and the positional design of the first sliding block 212 and the second sliding blocks 213 of the second insulative housing 21', the shape of the first cable-end connector 2 and the shape of the second cable-end connector 2' are different. By that the position of the first sliding block 212 of the first cable-end connector 2 and the positions of the second sliding blocks 213 of the first cable-end connector 2 respectively correspond to the position of the first guiding groove portion 119 of the first independent insertion groove 117 and the positions of the second guiding groove portions 121 of the first independent insertion groove 117, the shape of the first cable-end connector 2 cooperates with the shape of the first independent insertion groove 117, so as to limit that the first cable-end connector 2 only can properly insert into the first independent insertion groove 117. By the position of the first sliding block 212 of the second cable-end connector 2' and the positions of the second sliding blocks 213 of the second cable-end connector 2' respectively correspond to the position of the first guiding groove portion 120 of the second independent insertion groove 118 and the positions of the second guiding groove portions 122 of the second independent insertion groove 118, the shape of the second cable-end connector 2' cooperates with the shape of the second independent insertion groove 118, so as to limit that the second cable-end connector 2' only can properly insert into the second independent insertion groove 118.

With the above fool-proofing structure design, information before the user assembles the first cable-end connector 2 or the second cable-end connector 2' is supplied, it can prevent the user from wrongly upside down inserting the first cable-end connector 2 into the first independent insertion groove 117 or wrongly inserting the first cable-end connector 2 into the second independent insertion groove 118, or wrongly upside down inserting the second cable-end connector 2' into the second independent insertion groove 118 or wrongly inserting the second cable-end connector 2' into the first independent insertion groove 117. Therefore, the user can conveniently and rapidly insert the cable-end connector in the proper direction into the proper independent insertion groove.

It is noted that, the electrical connection device 100 of the present first embodiment also may omit the second guiding groove portions 121, 122 of the first independent insertion groove 117 and the second independent insertion groove 118 as desired, and omit the second sliding blocks 213 of the first cable-end connector 2 and the second cable-end connector 2'. Therefore, similarly, the fool-proofing structure can be provided.

When the first cable-end connector 2 or the second cable-end connector 2' is detached from the through-type connector 1, the user firstly applies a force by the finger to press down the lock-releasing blocks 225 of the elastic latch arm 216 of the first cable-end connector 2 or the second cable-end connector 2', so as to make the elastic latch arm 216 deflected and in turn make the latching block 224 move away from the corresponding latching groove 124. Then, the user applies a force by the finger to pull the lock-releasing blocks 225 of the elastic latch arm 216 of the first cable-end connector 2 or the second cable-end connector 2' to move rearwardly along the first direction D1, the first cable-end connector 2 or the second cable-end connector 2' can be independently detached from the through-type connector 1.

When the electrical connection device 100 is applied, because the first cable-end connector 2 and the second cable-end connector 2' each are an independent connector, two different suppliers can respectively purchase the first cable-end connector 2 and the second cable-end connector 2' for use. Each supplier completes assembling of the first cable-end connector 2 or the second cable-end connector 2' and a module in advance and then supplies to the client-end, only the client-end needs to independently insert the first cable-end connector 2 or the second cable-end connector 2' into the through-type connector 1, can the first cable-end connector 2 or the second cable-end connector 2' be used, it does not need that only the first cable-end connector 2 and the second cable-end connector 2' are firstly engaged together can the first cable-end connector 2 and the second cable-end connector 2' insert into the through-type connector 1. Therefore, convenience of assembling in the client-end is promoted. Moreover, when the client-end only needs to use one module, the supplier only needs to supply one cable-end connector and the module, purchase cost of the cable-end connector can be saved.

Figure 15:
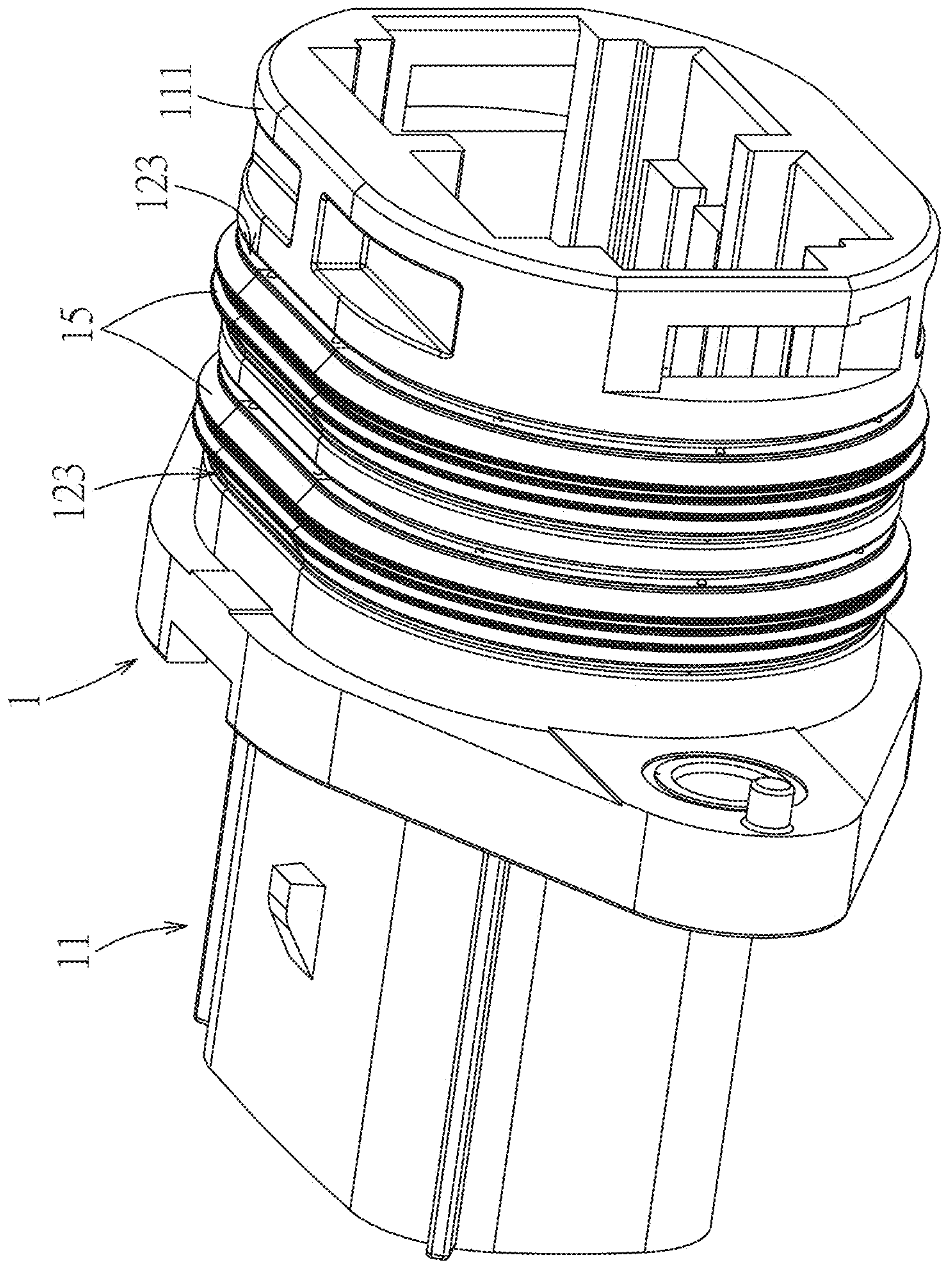
FIG. 15 is a perspective view of a through-type connector of a second embodiment of the electrical connection device of the present disclosure.

Referring to FIG. 15, an entire structure of a second embodiment of the electrical connection device 100 of the present disclosure is substantially the same as that of the first embodiment, and difference lies in the through-type connector 1.

The outer surface of the first peripheral wall 111 of the outer shell 11 of the through-type connector 1 is recessed to form two annular grooves 123 which are spaced apart from each other. The through-type connector 1 includes two annular sealing rings 15 which are respectively provided to the annular grooves 123. Therefore, sealing effect to seal the gap between the outer shell 11 and the panel 3 (as shown in FIG. 3) can be further promoted.

In conclusion, in the electrical connection device 100 of each embodiment, by that the first cable-end connector 2 is capable of independently inserting into the first independent insertion groove 117 of the first cavity 114 and the second cable-end connector 2' is capable of independently inserting into the second independent insertion groove 118 of the first cavity 114, convenience of assembling the first cable-end connector 2 and the second cable-end connector assemble 2' to the through-type connector 1 or detaching the first cable-end connector 2 and the second cable-end connector assemble 2' from the through-type connector 1 can be promoted, so the object of the present disclosure can be indeed attained.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. An electrical connection device comprising:

a through-type connector comprising an outer shell and a plurality of pins passing through the outer shell, the outer shell being formed with a first cavity and a second cavity, the first cavity having a first independent insertion groove and a second independent insertion groove, two opposite ends of each pin being respectively positioned in the first cavity and the second cavity;

a first cable-end connector provided to be capable of independently inserting into the first independent insertion groove of the first cavity and comprising a first insulative housing, a first terminal position assurance member which is provided to the first insulative housing, a plurality of first terminals which are provided to the first insulative housing and are respectively electrically connected with the corresponding pins and a plurality of first conductive wires which are respectively connected to the plurality of first terminals; and a second cable-end connector provided to be capable of independently inserting into the second independent insertion groove of the first cavity and comprising a second insulative housing, a second terminal position assurance member which is provided to the second insulative housing, a plurality of second terminals which are provided to the second insulative housing and are respectively electrically connected with the corresponding pins and a plurality of second conductive wires which are respectively connected to the plurality of second terminals.

2. The electrical connection device of claim 1, wherein an outer surface of the outer shell is recessed to form at least one annular groove, the through-type connector further comprises at least one annular sealing ring which is provided to the annular groove.

3. The electrical connection device of claim 2, wherein the outer surface of the outer shell is recessed to form two annular grooves, the through-type connector comprises two annular sealing rings which are respectively provided to the annular grooves.

4. The electrical connection device of claim 1, wherein the through-type connector is used to pass through a panel, the panel is formed with a through-hole which allows the outer shell to pass therethrough, the through-type connector further comprises a mounting plate which is formed to an outer surface of the outer shell and abuts against the panel, the mounting plate is formed with a mounting hole, the mounting hole is used to allow a fastener to pass therethrough so that the fastener fixes the mounting plate to the panel.

5. The electrical connection device of claim 4, wherein the through-type connector further comprises at least one annular sealing ring which is provided to the outer shell, the annular sealing ring is used to seal a gap between the outer shell and the panel and/or further comprises a sealing adhesive which is potted in at least one of the first cavity and the second cavity, the sealing adhesive seals gaps between the outer shell and the plurality of pins.

6. The electrical connection device of claim 4, wherein the through-type connector further comprises a bushing which is provided in the mounting hole, the bushing is used to allow the fastener to pass therethrough.

7. The electrical connection device of claim 1, wherein the outer shell is formed with two latching grooves which are respectively communicated with the first independent insertion groove and the second independent insertion groove, the first insulative housing and the second insulative housing each have an elastic latch arm, the elastic latch arm has a latching block which is used to latch in the corresponding latching groove.

8. The electrical connection device of claim 7, wherein the elastic latch arm further has a lock-releasing block which is exposed to the outer shell, the lock-releasing block is used to allow to be pressed down to make the elastic latch arm deflected and in turn force the latching block to move away from the corresponding latching groove, the lock-releasing block is further used to allow to be pulled to bring the first cable-end connector to move away from the first independent insertion groove or bring the second cable-end connector to move away from the second independent insertion groove.

9. The electrical connection device of claim 1, wherein the first terminal position assurance member and the second terminal position assurance member each have one two-stage type latching structure, when the first terminal position assurance member moves along a first direction relative to the first insulative housing, the first terminal position assurance member is capable of being selectively positioned to a pre-latching position and a final-latching position by means of the two-stage type latching structure, when the second terminal position assurance member moves along the first direction relative to the second insulative housing, the second terminal position assurance member is capable of being selectively positioned to a pre-latching position and a final-latching position by means of the two-stage type latching structure.

10. The electrical connection device of claim 9, wherein the two-stage type latching structure comprises two elastic latching arms which are inversely provided, each elastic latching arm extends along the first direction.

11. The electrical connection device of claim 10, wherein the first insulative housing and the second insulative housing each have two first stopping blocks which are inversely provided and two second stopping blocks which are inversely provided, each first stopping block and the corresponding second stopping block are spaced apart from each other along the first direction, each elastic latching arm has a first latching hook and a second latching hook which are spaced apart from each other along the first direction, when the first latching hook of each elastic latching arm of the first terminal position assurance member and the second terminal position assurance member latches to the corresponding first stopping block, the first terminal position assurance member and the second terminal position assurance member is positioned to the pre-latching position, when the second latching hook of each elastic latching arm of the first terminal position assurance member and the second terminal position assurance member latches to the corresponding second stopping block, the first terminal position assurance member and the second terminal position assurance member is positioned to the final-latching position.

12. The electrical connection device of claim 10, wherein the first insulative housing and the second insulative housing each have two guiding rail groups which are inversely provided, each guiding rail group has two guiding rails which are spaced apart from each other, each elastic latching arm has two slidable connecting bars which are respectively capable of being slidably connected to the corresponding guiding rails along the first direction.

13. The electrical connection device of claim 10, wherein each elastic latching arm has a plurality of barbs which are arranged along the first direction.

14. The electrical connection device of claim 9, wherein first insulative housing and the second insulative housing each have a plurality of stopping members, each stopping member has two elastic cantilevered arms which are inversely provided, the first insulative housing and the second insulative housing each are formed with a passageway, the passageway has a gap which is between the elastic cantilevered arms of each stopping member, each elastic cantilevered arm is used to stop the corresponding first terminal or second terminal, the first terminal position assurance member and the second terminal position assurance member each have a partitioning plate, when the first terminal position assurance member and the second terminal position assurance member are positioned to the pre-latching position, the partitioning plate does not extend into the corresponding gap, when the first terminal position assurance member and the second terminal position assurance member are positioned to the final-latching position, the partitioning plate extends into the corresponding gap and partitions and stops the corresponding elastic cantilevered arms.

15. The electrical connection device of claim 1, wherein a shape of the first independent insertion groove and a shape of the second independent insertion groove are different, a shape of the first cable-end connector and a shape of the second cable-end connector are different, the shape of the first cable-end connector and the shape of the first independent insertion groove cooperate with each other, the shape of the second cable-end connector and the shape of the second independent insertion groove cooperate with each other.

16. The electrical connection device of claim 15, wherein the first independent insertion groove and the second independent insertion groove each have a first guiding groove portion, the first guiding groove portion extends along a first direction, the first guiding groove portion of the first independent insertion groove and the first guiding groove portion of the second independent insertion groove are spaced apart from each other along a second direction and are close to each other, or the first guiding groove portion of the first independent insertion groove and the first guiding groove portion of the second independent insertion groove are spaced apart from each other along the second direction and are away from each other, the second direction is perpendicular to the first direction, the first insulative housing and the second insulative housing each have a first sliding block which extends along the first direction, a position of the first sliding block of the first insulative housing and a position of the first guiding groove portion of the first independent insertion groove correspond to each other, the first sliding block of the first insulative housing is capable of being slidably connected to the first guiding groove portion of the first independent insertion groove, a position of the first sliding block of the second insulative housing and a position of the first guiding groove portion of the second independent insertion groove correspond to each other, the first sliding block of the second insulative housing is capable of being slidably connected to the first guiding groove portion of the second independent insertion groove.

17. The electrical connection device of claim 16, wherein the first independent insertion groove and the second independent insertion groove each further have two second guiding groove portions which are spaced apart from each other along the second direction, each second guiding groove portion extends along the first direction, the first guiding groove portion and the second guiding groove portions are spaced apart from each other along a third direction which is perpendicular to the first direction and the second direction, the first insulative housing and the second insulative housing each have two second sliding blocks, positions of the second sliding blocks of the first insulative housing and positions of the second guiding groove portions of the first independent insertion groove respectively correspond to each other, the second sliding blocks of the first insulative housing respectively are capable of being slidably connected to the second guiding groove portions of the first independent insertion groove, positions of the second sliding blocks of the second insulative housing and positions of the second guiding groove portions of the second independent insertion groove respectively correspond to each other, the second sliding blocks of the second insulative housing respectively are capable of being slidably connected to the second guiding groove portions of the second independent insertion groove.

18. An electrical connection device comprising:

a through-type connector comprising an outer shell formed with a first independent insertion groove and a second independent insertion groove, wherein each independent insertion groove includes a latching groove extending from a front end of the respective outer shell and along a first direction of the respective independent insertion groove, a first guiding groove portion extending from the front end of the respective outer shell and along the first direction of the respective independent insertion groove, and two second guiding groove portions extending from the front end of the respective outer shell and along the first direction of the respective independent insertion groove, wherein the two second guiding groove portions are spaced apart from each other along each independent insertion groove;

a first cable-end connector provided to be capable of independently inserting into the first independent insertion groove and being electrically connected to the through-type connector, the first cable-end connector comprising a first insulative housing having a latch arm configured to be inserted into the latching groove of the first independent insertion groove and sliding blocks which are configured to be inserted into the guiding groove portions of the first independent insertion groove; and a second cable-end connector provided to be capable of independently inserting into the second independent insertion groove and being electrically connected to the through-type connector, the second cable-end connector comprising a second insulative housing having a latch arm configured to be inserted into the latching groove of the second independent insertion groove and sliding blocks which are configured to be inserted into the guiding groove portions of the second independent insertion groove.

19. The electrical connection device of claim 18, wherein a shape of the first independent insertion groove and a shape of the second independent insertion groove are different, a shape of the first cable-end connector and a shape of the second cable-end connector are different, the shape of the first cable-end connector and the shape of the first independent insertion groove cooperate with each other, the shape of the second cable-end connector and the shape of the second independent insertion groove cooperate with each other.

20. The electrical connection device of claim 18, wherein the latching groove, the first guiding groove portion and the two second guiding groove portions are on different walls of the respective independent insertion grooves.

* * * * *